(12) United States Patent
Li et al.

(10) Patent No.: US 10,091,650 B2
(45) Date of Patent: Oct. 2, 2018

(54) WIRELESS TERMINAL CONFIGURATION METHOD, DEVICE, AND SYSTEM

(71) Applicant: Huawei Device (Dongguan) Co., Ltd., Dongguan (CN)

(72) Inventors: Xiaoxian Li, Shenzhen (CN); Zhiming Ding, Shenzhen (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 140 days.

(21) Appl. No.: 14/924,132

(22) Filed: Oct. 27, 2015

(65) Prior Publication Data
US 2016/0050566 A1    Feb. 18, 2016

Related U.S. Application Data

(63) Continuation of application No. PCT/CN2013/075006, filed on Apr. 28, 2013.

(51) Int. Cl.
H04W 12/06    (2009.01)
H04L 29/06    (2006.01)
(Continued)

(52) U.S. Cl.
CPC ......... *H04W 12/06* (2013.01); *H04L 63/0853* (2013.01); *H04M 1/72527* (2013.01);
(Continued)

(58) Field of Classification Search
CPC ................................................ H04W 12/06
See application file for complete search history.

(56) References Cited

U.S. PATENT DOCUMENTS

2007/0079113 A1    4/2007    Kulkarni et al.
2008/0175187 A1    7/2008    Lowry et al.
(Continued)

FOREIGN PATENT DOCUMENTS

CN    101616017 A    12/2009
CN    102291493 A    12/2011
(Continued)

OTHER PUBLICATIONS

Foreign Communication From a Counterpart Application, European Application No. 13883607.7, Extended European Search Report dated Apr. 26, 2016, 8 pages.
(Continued)

*Primary Examiner* — Oleg Korsak
*Assistant Examiner* — Simon P Kanaan
(74) *Attorney, Agent, or Firm* — Conley Rose, P.C.

(57) ABSTRACT

A wireless terminal configuration method, device, and system. The method provided in the embodiments of the present disclosure includes acquiring, by a configuration device, device identification information and configuration password information of a wireless terminal; sending, by the configuration device, configuration triggering information to the wireless terminal according to the device identification information of the wireless terminal; performing, by the configuration device, verification with the wireless terminal according to the configuration password information; sending, by the configuration device, credential information required for the wireless terminal to access an access point (AP) and device identification information of the AP to the wireless terminal; and sending, by the configuration device, the credential information and the device identification information of the wireless terminal to the AP.

19 Claims, 9 Drawing Sheets

(51) Int. Cl.
    *H04M 1/725*     (2006.01)
    *H04W 4/80*      (2018.01)
    *H04W 76/14*     (2018.01)
    *H04W 88/02*     (2009.01)

(52) U.S. Cl.
    CPC ............. *H04W 4/80* (2018.02); *H04W 76/14* (2018.02); *H04M 1/7253* (2013.01); *H04W 88/02* (2013.01)

(56)  References Cited

U.S. PATENT DOCUMENTS

| 2012/0120892 A1* | 5/2012 | Freda ................ H04W 8/005 370/329 |
| 2012/0263286 A1 | 10/2012 | Liao et al. |
| 2014/0106733 A1 | 4/2014 | Wei |

FOREIGN PATENT DOCUMENTS

| CN | 102740296 A  | 10/2012 |
| WO | 2013006315 A1 | 1/2013 |

OTHER PUBLICATIONS

Foreign Communication From a Counterpart Application, PCT Application No. PCT/CN2013/075006, English Translation of International Search Report dated Jan. 30, 2014, 2 pages.
Foreign Communication From a Counterpart Application, PCT Application No. PCT/CN2013/075006, English Translation of Written Opinion dated Jan. 30, 2014, 18 pages.

* cited by examiner

WIRELESS TERMINAL CONFIGURATION METHOD, DEVICE, AND SYSTEM

CROSS REFERENCE AND RELATED APPLICATIONS

This application is a continuation of International Application No. PCT/CN2013/075006, filed on Apr. 28, 2013, which is incorporated herein by reference in its entirety.

TECHNICAL FIELD

The present disclosure relates to the field of communications, and in particular, to a wireless terminal configuration method, device, and system.

BACKGROUND

Wireless Fidelity (Wi-Fi) finds wide use in a variety of industries due to advantages such as rapid to deploy, ease of use, and high transmission rate. However, security setup for Wi-Fi networks is so complex that many users of the wireless networks do not configure any security parameter at all. Consequently, the networks are prone to attacks. To ensure secure, convenient use of wireless networks, the Wi-Fi Alliance releases a Wi-Fi Protected Setup (WPS) standard, also referred to as Wi-Fi Simple Configuration (WSC), to perform security configuration for an accessing wireless terminal, so that a user with little acknowledge of wireless setup and security can still set up a secure wireless local area network (WLAN) easily and conveniently, and add a device to the network conveniently and securely.

An entity referred to as a registrar is defined in the WPS standard to complete configuration for a wireless terminal. A registrar may be built in a wireless access device, and may also be an external registrar independent of a wireless access device, where an external registrar may be referred to as a configuration device. In a case in which an external configuration device is used, in a wireless terminal configuration process in the prior art, a wireless access device needs to forward a corresponding request from a wireless terminal to the configuration device, and forward a corresponding response from the configuration device to the wireless terminal. Consequently, the three all need to be in a working state in the configuration process. When the wireless access device is in an area in which normal communication with the wireless terminal is not available or the wireless access device is in an offline state, configuration for the wireless terminal cannot be completed, resulting in a lack of flexibility in the wireless terminal configuration process.

SUMMARY

Embodiments of the present disclosure provide a wireless terminal configuration method, device, and system. Configuration for a wireless terminal is completed by means of direct communication between a configuration device and the wireless terminal, such that configuration for the wireless terminal can still be completed without involvement of a wireless access device in the configuration process.

To achieve the objective, the embodiments of the present disclosure use the following technical solutions.

According to a first aspect, an embodiment of the present disclosure provides a wireless terminal configuration method, where a direct connection is established between a configuration device and a wireless terminal, and the method includes acquiring, by the configuration device, device identification information and configuration password information of the wireless terminal. The method may further comprise sending, by the configuration device, configuration triggering information to the wireless terminal according to the device identification information of the wireless terminal. The method may further comprise performing, by the configuration device, verification with the wireless terminal according to the configuration password information, to determine that the wireless terminal has ownership of the configuration password information. The method may further comprise sending, by the configuration device, credential information required for the wireless terminal to access a wireless access device and device identification information of the wireless access device to the wireless terminal, such that after the verification succeeds, the wireless terminal requests, according to the credential information and the device identification information of the wireless access device, to access the wireless access device. The method may further comprise sending, by the configuration device, the credential information and the device identification information of the wireless terminal to the wireless access device, such that the wireless access device processes, according to the credential information and the device identification information of the wireless terminal, the request of the wireless terminal to access the wireless access device.

With reference to the first aspect, in a first possible implementation, the acquiring, by the configuration device, device identification information and configuration password information of the wireless terminal includes acquiring, by the configuration device, the configuration password information and the device identification information of the wireless terminal by scanning a multi-dimensional code of the wireless terminal device.

With reference to the first aspect, in a second possible implementation, the acquiring, by the configuration device, device identification information and configuration password information of the wireless terminal includes receiving, by the configuration device, configuration request information sent by the wireless terminal. The configuration request information includes the device identification information of the wireless terminal and indication information of using a personal identification number (PIN) manner. The method may further comprise receiving, by the configuration device, the configuration password information input by a user, where the configuration password information includes a PIN of the wireless terminal.

With reference to the first aspect, in a third possible implementation, the acquiring, by the configuration device, device identification information and configuration password information of the wireless terminal includes receiving, by the configuration device, configuration request information sent by the wireless terminal. The configuration request information includes the device identification information of the wireless terminal and indication information of using a push button configuration (PBC) manner. The method may further comprise interacting, by the configuration device, with the wireless terminal in the PBC configuration manner, and using a default PIN as the configuration password information during the interaction.

With reference to the first aspect, in a fourth possible implementation, the acquiring, by the configuration device, device identification information and configuration password information of the wireless terminal includes reading, by the configuration device, the configuration password information of the wireless terminal and the device identification information of the wireless terminal using a near field communication (NFC) interface.

With reference to the first aspect and any one of the first to fourth possible implementations, in a fifth possible implementation, a manner for the direct connection between the configuration device and the wireless terminal includes an ad hoc connection.

With reference to the first aspect and any one of the first to fourth possible implementations, in a sixth possible implementation, a manner for the direct connection includes a peer to peer (P2P) connection.

With reference to the sixth possible implementation, in a seventh possible implementation, the sending, by the configuration device, configuration triggering information to the wireless terminal according to the device identification information of the wireless terminal includes sending, by the configuration device, the configuration triggering information to the wireless terminal according to the device identification information of the wireless terminal using a probe response frame or a beacon frame.

With reference to either one of the sixth or seventh possible implementation, in an eighth possible implementation, the performing, by the configuration device, verification with the wireless terminal according to the configuration password information includes performing, by the configuration device, verification with the wireless terminal according to the configuration password information using an Extensible Authentication Protocol (EAP) message.

With reference to any one of the sixth to eighth possible implementations, in a ninth possible implementation, the sending, by the configuration device, credential information required for the wireless terminal to access a wireless access device and device identification information of the wireless access device to the wireless terminal includes sending, by the configuration device, the credential information required for the wireless terminal to access the wireless access device and the device identification information of the wireless access device to the wireless terminal using the EAP message.

According to a second aspect, an embodiment of the present disclosure provides a wireless terminal configuration method, where a direct connection is established between a wireless terminal and a configuration device, and the method includes receiving, by the wireless terminal, configuration triggering information that is sent by the configuration device according to device identification information of the wireless terminal. The method further comprises performing, by the wireless terminal, verification with the configuration device, such that the configuration device determines that the wireless terminal has ownership of configuration password information. The method may further comprise receiving, by the wireless terminal, credential information required for the wireless terminal to access a wireless access device and identification information of the wireless access device that are sent by the configuration device, such that after the verification succeeds, the wireless terminal requests, according to the credential information and the device identification information of the wireless access device, to access the wireless access device.

With reference to the second aspect, in a first possible implementation, before the receiving, by the wireless terminal, configuration triggering information that is sent by the configuration device according to device identification information of the wireless terminal, the method further includes sending, by the wireless terminal, a configuration request message to the configuration device, where the configuration request message includes the device identification information of the wireless terminal and indication information of using a PIN manner, such that the configuration device receives, according to the configuration request message, the configuration password information input by a user, where the configuration password information includes a PIN of the wireless terminal.

With reference to the second aspect, in a second possible implementation, before the receiving, by the wireless terminal, configuration triggering information that is sent by the configuration device according to device identification information of the wireless terminal, the method further includes sending, by the wireless terminal, a configuration request message to the configuration device, where the configuration request message includes the device identification information of the wireless terminal and indication information of using a PBC manner, such that the configuration device interacts with the wireless terminal in the PBC configuration manner, and uses a default PIN as the configuration password information during the interaction.

With reference to the second aspect and any one of the first to second possible implementations, in a third possible implementation, a manner for the direct connection includes an ad hoc connection.

With reference to the second aspect and any one of the first to second possible implementations, in a fourth possible implementation, a manner for the direct connection includes a P2P connection.

With reference to the fourth possible implementation, in a fifth possible implementation, the receiving, by the wireless terminal, configuration triggering information that is sent by the configuration device according to device identification information of the wireless terminal includes receiving, by the wireless terminal, the configuration triggering information that is sent by the configuration device according to the device identification information of the wireless terminal using a probe response frame or a beacon frame.

With reference to any one of the fourth and fifth possible implementations, in a sixth possible implementation, the performing, by the wireless terminal, verification with the configuration device includes performing, by the wireless terminal, verification with the configuration device using an EAP message.

With reference to any one of the fourth to sixth possible implementations, in a seventh possible implementation, the receiving, by the wireless terminal, credential information required for the wireless terminal to access a wireless access device and identification information of the wireless access device that are sent by the configuration device includes receiving, by the wireless terminal, the credential information required for the wireless terminal to access the wireless access device and the identification information of the wireless access device that are sent by the configuration device using the EAP message.

According to a third aspect, an embodiment of the present disclosure provides a configuration device, directly connected to a wireless terminal, where the configuration device includes an acquirer configured to acquire configuration password information and transmit the configuration password information to a processor. The processor configured to generate configuration triggering information according to the configuration password information. The acquirer is further configured to perform verification with the wireless terminal according to the configuration password information, to determine that the wireless terminal has ownership of the configuration password information. The device further comprises a communications unit, communicating with an external network element using a direct connect communication link, and configured to send the configuration triggering information to the wireless terminal. The communications unit is further configured to send credential information required for the wireless terminal to access a wireless access device and device identification information of the wireless access device to the wireless terminal, such that after the verification succeeds, the wireless terminal requests, according to the credential information and the device identification information of the wireless access device, to access the wireless access device. The communications unit is further configured to send the credential information of the wireless terminal and device identification information of the wireless terminal to the wireless access device, such that the wireless access device processes, according to the credential information of the wireless terminal and the identification information of the wireless terminal, the request of the wireless terminal to access the wireless access device.

With reference to the third aspect, in a first possible implementation, the acquirer includes a multi-dimensional code scanner configured to scan a multi-dimensional code of the wireless terminal device to acquire the configuration password information and the device identification information of the wireless terminal.

With reference to the third aspect, in a second possible implementation, the communications unit is further configured to receive a configuration request message sent by the wireless terminal, where the configuration request message includes the device identification information of the wireless terminal and indication information of using a PIN manner. The acquirer includes a keyboard configured to receive the configuration password information of the wireless terminal input by a user, where the configuration password information includes a PIN of the wireless terminal.

With reference to the third aspect, in a third possible implementation, the communications unit is further configured to receive a configuration request message sent by the wireless terminal, where the configuration request message includes the device identification information of the wireless terminal and indication information of using a PBC manner. The acquirer includes a PBC button configured to interact with the wireless terminal in the PBC configuration manner, and use a default PIN as the configuration password information during the interaction.

With reference to the third aspect, in a fourth possible implementation, the acquirer includes an NFC interface configured to read the configuration password information of the wireless terminal and the device identification information of the wireless terminal.

With reference to the third aspect and any one of the first to fourth possible implementations, in a fifth possible implementation, the communicating, by the communications unit, with an external network element using a direct connect communication link includes communicating, by the communications unit, with an external network element using an ad hoc connection link.

With reference to the third aspect and any one of the first to fourth possible implementations, in a sixth possible implementation, the communicating, by the communications unit, with an external network element using a direct connect communication link includes communicating, by the communications unit, with an external network element using a P2P connection link.

With reference to the sixth possible implementation, in a seventh possible implementation, the configuration triggering information includes a probe response frame or a beacon frame.

With reference to the sixth or seventh possible implementation, in an eighth possible implementation, the performing verification with the wireless terminal according to the configuration password information, to determine that the wireless terminal has ownership of the configuration password information includes performing verification with the wireless terminal according to the configuration password information using an EAP message, to determine that the wireless terminal has ownership of the configuration password information.

With reference to any one of the sixth to eighth possible implementations, in a ninth possible implementation, the sending credential information required for the wireless terminal to access a wireless access device and device identification information of the wireless access device to the wireless terminal includes sending the credential information for the wireless terminal to access the wireless access device and the device identification information of the wireless access device to the wireless terminal using the EAP message.

According to a fourth aspect, an embodiment of the present disclosure provides a configuration device, where the configuration device includes an acquiring unit configured to acquire device identification information and configuration password information of the wireless terminal. The acquiring unit is also configured to transmit the device identification information of the wireless terminal to a first sending unit and transmit the configuration password information of the wireless terminal to a verifying unit. The first sending unit configured to receive the device identification information of the wireless terminal from the acquiring unit and send configuration triggering information to the wireless terminal according to the device identification information of the wireless terminal using a direct connect communication link. The verifying unit configured to receive the configuration password information from the acquiring unit. The verifying unit is also configured to perform verification with the wireless terminal according to the configuration password information using the direct connect communication link, to determine that the wireless terminal has ownership of the configuration password information. The first sending unit is further configured to send credential information required for the wireless terminal to access a wireless access device and device identification information of the wireless access device to the wireless terminal using the direct connect communication link. After verification by the verifying unit succeeds, the wireless terminal requests, according to the credential information and the device identification information of the wireless access device, to access the wireless access device. A second sending unit configured to receive the device identification information of the wireless terminal from the acquiring unit. A second sending unit is configured to send the credential information of the wireless terminal and the device identification information of the wireless terminal to the wireless access device, such that the wireless access device processes, according to the credential information of the wireless terminal and the device identification information of the wireless terminal, the request of the wireless terminal to access the wireless access device.

With reference to the fourth aspect, in a first possible implementation, the acquiring unit is configured to acquire the configuration password information of the wireless terminal and the device identification information of the wireless terminal by scanning a multi-dimensional code of the wireless terminal device.

With reference to the fourth aspect, in a second possible implementation, the acquiring unit includes a receiving module configured to receive a configuration request message sent by the wireless terminal, where the configuration request message includes the device identification information of the wireless terminal and indication information of using a PIN manner. A PIN module configured to receive the configuration password information of the wireless terminal input by a user, where the configuration password information of the wireless terminal includes a PIN of the wireless terminal.

With reference to the fourth aspect, in a third possible implementation, the acquiring unit includes a receiving module configured to receive a configuration request message sent by the wireless terminal, where the configuration request message includes the device identification information of the wireless terminal and indication information of using a PBC manner. A PBC module configured to interact with the wireless terminal in the PBC configuration manner, and use a default PIN as the configuration password information during the interaction.

With reference to the fourth aspect, in a fourth possible implementation, the acquiring unit is further configured to read the configuration password information of the wireless terminal and the device identification information of the wireless terminal using an NFC interface.

With reference to the fourth aspect and any one of the first to fourth possible implementations, in a fifth possible implementation, the direct connection includes an ad hoc connection.

With reference to the fourth aspect and any one of the first to fourth possible implementations, in a sixth possible implementation, the direct connection includes a P2P connection.

With reference to the sixth possible implementation, in a seventh possible implementation, the first sending unit is configured to send the configuration triggering information to the wireless terminal according to the device identification information of the wireless terminal using a probe response frame or a beacon frame.

With reference to the sixth or seventh possible implementation, in an eighth possible implementation, the verifying unit is configured to perform verification with the wireless terminal according to the configuration password information using an EAP message.

With reference to any one of the sixth to eighth possible implementations, in a ninth possible implementation, the first sending unit is configured to send the credential information required for the wireless terminal to access the wireless access device and the device identification information of the wireless access device to the wireless terminal using the EAP message.

According to a fifth aspect, an embodiment of the present disclosure provides a wireless terminal, directly connected to a configuration device, where the wireless terminal includes a communications unit, communicating with an external network element using a direct connect communication link. The communications unit is further configured to receive configuration triggering information that is sent by the configuration device according to device identification information of the wireless terminal. A processor configured to perform verification with the configuration device, such that the configuration device determines that the wireless terminal has ownership of configuration password information. The communications unit is further configured to receive credential information required for the wireless terminal to access a wireless access device and identification information of the wireless access device that are sent by the configuration device. After the verification succeeds, the wireless terminal requests, according to the credential information and the device identification information of the wireless access device, to access the wireless access device.

With reference to the fifth aspect, in a first possible implementation, the communications unit is further configured to send a configuration request message to the configuration device, where the configuration request message includes the device identification information of the wireless terminal and indication information of using a PIN manner, such that the configuration device receives, according to the configuration request message, the configuration password information input by a user, where the configuration password information includes a PIN of the wireless terminal.

With reference to the fifth aspect, in a second possible implementation, the communications unit is further configured to send a configuration request message to the configuration device, where the configuration request message includes the device identification information of the wireless terminal and indication information of using a PBC manner, such that the configuration device interacts with the wireless terminal in the PBC configuration manner, and uses a default PIN as the configuration password information during the interaction.

With reference to the fifth aspect and any one of the first to second possible implementations, in a third possible implementation, the communicating, by the communications unit, with an external network element using a direct connect communication link includes communicating, by the communications unit, with an external network element using an ad hoc connection link.

With reference to the fifth aspect and any one of the first to second possible implementations, in a fourth possible implementation, the communicating, by the communications unit, with an external network element using a direct connect communication link includes communicating, by the communications unit, with an external network element using a P2P connection link.

With reference to the fourth possible implementation, in a fifth possible implementation, the communications unit is configured to receive the configuration triggering information that is sent by the configuration device according to the device identification information of the wireless terminal using a probe response frame or a beacon frame.

With reference to any one of the fourth and fifth possible implementations, in a sixth possible implementation, the performing verification with the configuration device, such that the configuration device determines that the wireless terminal has ownership of configuration password information includes performing verification with the configuration device using an EAP message.

With reference to any one of the fourth to sixth possible implementations, in a seventh possible implementation, the receiving credential information required for the wireless terminal to access a wireless access device and identification information of the wireless access device that are sent by the configuration device includes receiving the credential information required for the wireless terminal to access the wireless access device and the identification information of the wireless access device that are sent by the configuration device using the EAP message.

According to a sixth aspect, an embodiment of the present disclosure provides a wireless terminal, directly connected to a configuration device, where the wireless terminal includes a receiving unit configured to receive, using a direct connect communication link, configuration triggering information that is sent by the configuration device according to device identification information of the wireless terminal. A verifying unit configured to perform verification with the configuration device using the direct connect communication link, such that the configuration device determines that the wireless terminal has ownership of configuration password information. The receiving unit is further configured to receive, using the direct connect communication link, credential information required for the wireless terminal to access a wireless access device and identification information of the wireless access device that are sent by the configuration device. After the verification succeeds, the wireless terminal requests, according to the credential information and the device identification information of the wireless access device, to access the wireless access device.

With reference to the sixth aspect, in a first possible implementation, the wireless terminal further includes a sending unit configured to send a configuration request message to the configuration device, where the configuration request message includes the device identification information of the wireless terminal and indication information of using a PIN manner, such that the configuration device receives, according to the configuration request message, the configuration password information input by a user, where the configuration password information includes a PIN of the wireless terminal.

With reference to the sixth aspect, in the first possible implementation, the wireless terminal further includes a sending unit, sending a configuration request message to the configuration device, where the configuration request message includes the device identification information of the wireless terminal and indication information of using a PBC manner, such that the configuration device interacts with the wireless terminal in the PBC configuration manner, and uses a default PIN as the configuration password information during the interaction.

With reference to the sixth aspect and any one of the first to second possible implementations, in a third possible implementation, the direct connection includes an ad hoc connection.

With reference to the sixth aspect and any one of the first to second possible implementations, in a fourth possible implementation, the direct connection is a P2P connection.

With reference to the fourth possible implementation, in a fifth possible implementation, the receiving unit is configured to receive the configuration triggering information that is sent by the configuration device according to the device identification information of the wireless terminal using a probe response frame or a beacon frame.

With reference to any one of the fourth and fifth possible implementations, in a sixth possible implementation, the verifying unit is configured to perform verification with the configuration device using an EAP message.

With reference to any one of the fourth to sixth possible implementations, in a seventh possible implementation, the receiving unit is configured to receive the credential information required for the wireless terminal to access the wireless access device and the identification information of the wireless access device that are sent by the configuration device using the EAP message.

According to a seventh aspect, an embodiment of the present disclosure provides a device configuration system, including the configuration device according to any one of the third aspect and the fourth aspect and the wireless terminal according to any one of the fifth aspect and the sixth aspect.

With reference to the seventh aspect, in a first possible implementation, the system further includes a wireless access device configured to receive credential information of the wireless terminal and identification information of the wireless terminal that are sent by the configuration device, and process, according to the credential information of the wireless terminal and the identification information of the wireless terminal, a request of the wireless terminal to access the wireless access device.

In the wireless terminal configuration method, device, and system provided in the embodiments of the present disclosure, configuration for a wireless terminal is completed by means of direct communication between a configuration device and the wireless terminal, such that configuration for the wireless terminal can still be completed without involvement of a wireless access device in the configuration process, and flexibility with the configuration process is thereby increased. The present disclosure helps address the problem in the prior art in which all devices need to be in a working state in a configuration process, and when a wireless access device is in an area in which normal communication is not available or a wireless access device is in an offline state, configuration for a wireless terminal cannot be completed.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show merely some embodiments of the present disclosure, and persons of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

It should be noted that, sequence numbers involved in method embodiments of the present disclosure, such as S101 and S102, are merely used for identifying steps in methods instead of limiting an order of numbered steps.

Figure 1:
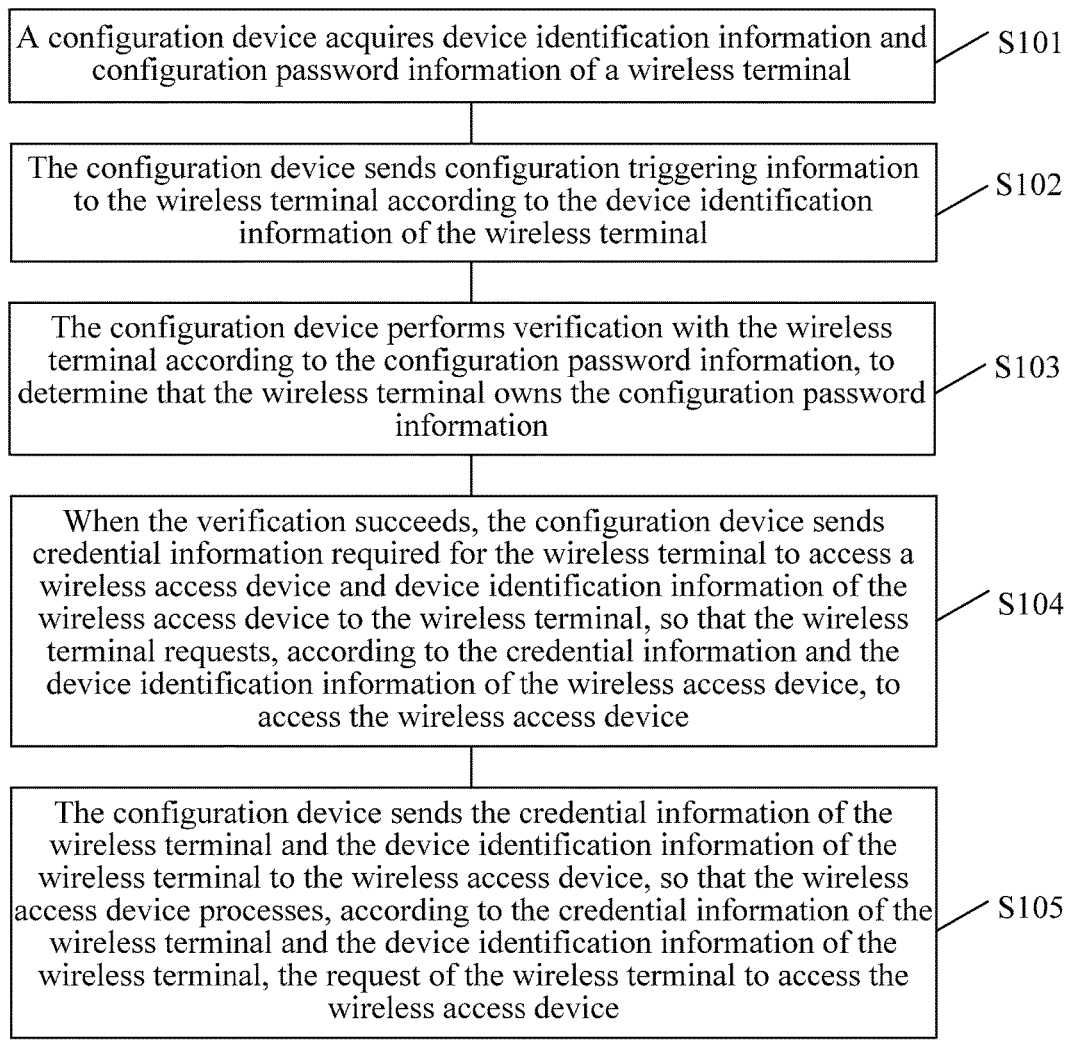
FIG. 1 is a flowchart of a wireless terminal configuration method according to an embodiment of the present disclosure.

FIG. 1 is a schematic flowchart illustrating a wireless terminal configuration method from the perspective of a configuration device, where the configuration device is directly connected to a wireless terminal in a manner including P2P connection and ad hoc connection. The manner for the direct connection between the configuration device and the wireless terminal is not limited in this embodiment of the present disclosure. Exemplarily, in this embodiment of the present disclosure, a P2P connection manner is used between the configuration device and the wireless terminal. As shown in the figure, the method may include the following steps.

S101: The configuration device acquires device identification information and configuration password information of the wireless terminal.

Exemplarily, the configuration device may acquire the device identification information and the configuration password information of the wireless terminal by selecting any one of the following manners.

1. The configuration device acquires the configuration password information and the device identification information of the wireless terminal by scanning a multi-dimensional code of the wireless terminal device.

2. The configuration device receives a configuration request message sent by the wireless terminal, where the configuration request message includes the device identification information of the wireless terminal and indication information of using a PIN manner. The configuration device receives the configuration password information input by a user, where the configuration password information includes a PIN of the wireless terminal.

3. The configuration device receives a configuration request message sent by the wireless terminal, where the configuration request message includes the device identification information of the wireless terminal and indication information of using a PBC manner. The configuration device interacts with the wireless terminal in the PBC configuration manner, and uses a default PIN (such as "00000000" specified in the WPS standard) as the configuration password during the interaction.

4. The configuration device reads the configuration password information of the wireless terminal and the device identification information of the wireless terminal using an NFC interface.

S102: The configuration device sends configuration triggering information to the wireless terminal according to the device identification information of the wireless terminal.

Exemplarily, the configuration device may use a probe response frame or a beacon frame to send the configuration triggering information to the wireless terminal according to the device identification information of the wireless terminal.

S103: The configuration device performs verification with the wireless terminal according to the configuration password information, to determine that the wireless terminal has ownership of the configuration password information.

Exemplarily, the configuration device may use an EAP message to perform verification with the wireless terminal according to the configuration password information.

S104: The configuration device sends credential information required for the wireless terminal to access a wireless access device and device identification information of the wireless access device to the wireless terminal, such that after the verification succeeds, the wireless terminal requests, according to the credential information and the device identification information of the wireless access device, to access the wireless access device.

Exemplarily, the configuration device may use an EAP message to send the credential information required for the wireless terminal to access the wireless access device and the device identification information of the wireless access device to the wireless terminal.

It should be noted that, depending on different verification manners and message exchange procedures, step S104 may also be performed concurrently with step S103. This embodiment is not intended to restrict that step S104 has to be performed after step S103 is completed.

S105: The configuration device sends the credential information and the device identification information of the wireless terminal to the wireless access device, such that the wireless access device processes, according to the credential information and the device identification information of the wireless terminal, the request of the wireless terminal to access the wireless access device.

It should be noted that, step S105 may be performed at any time after the verification in step S103 succeeds. This embodiment is not intended to restrict that step S105 has to be performed immediately after step S103 or step S014 is completed.

In the wireless terminal configuration method provided in this embodiment of the present disclosure, configuration for a wireless terminal is completed by means of direct communication between a configuration device and the wireless terminal, such that configuration for the wireless terminal can still be completed without involvement of a wireless access device in the configuration process, and flexibility with the configuration process is thereby increased. The method helps address the problem in the prior art in which all devices need to be in a working state in the configuration process, and when a wireless access device is in an area in which normal communication is not available or a wireless access device is in an offline state, configuration for a wireless terminal cannot be completed.

Figure 2:
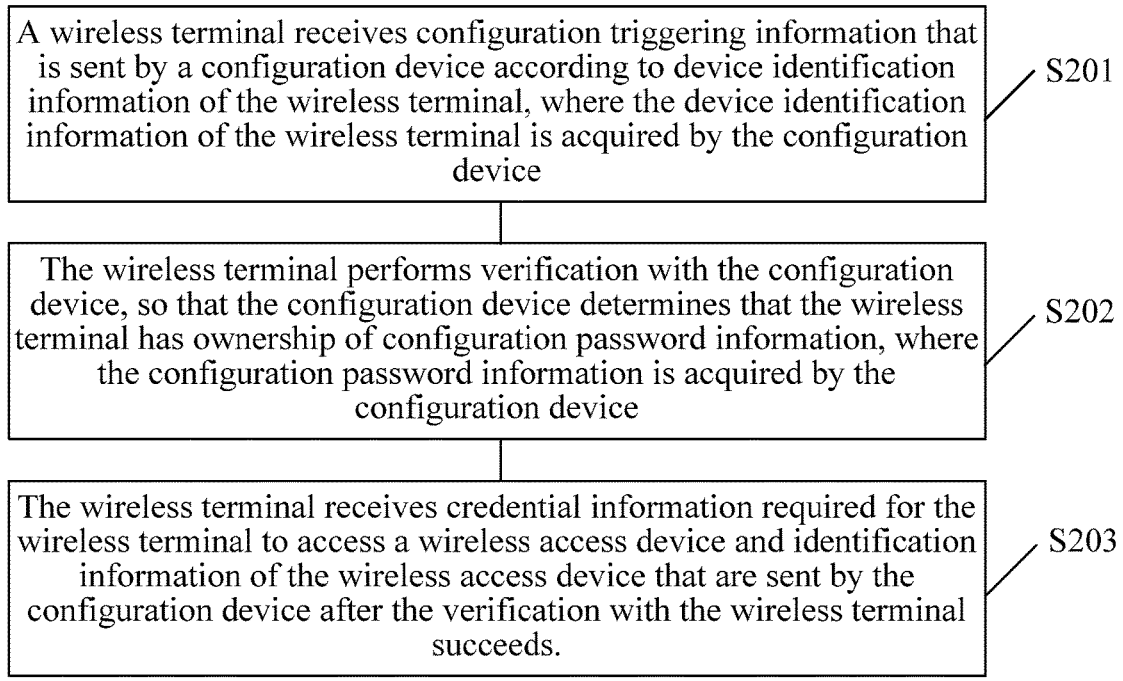
FIG. 2 is a flowchart of another wireless terminal configuration method according to an embodiment of the present disclosure.

FIG. 2 is a schematic flowchart illustrating a wireless terminal configuration method from the perspective of a wireless terminal, where the wireless terminal is directly connected to a configuration device in a manner including P2P connection and ad hoc connection. The manner for the direct connection between the configuration device and the wireless terminal is not limited in this embodiment of the present disclosure. Preferably, in this embodiment of the present disclosure, a P2P connection manner is used between the configuration device and the wireless terminal. As shown in the figure, the method may include the following steps.

S201: The wireless terminal receives configuration triggering information that is sent by the configuration device according to device identification information of the wireless terminal.

Exemplarily, the device identification information of the wireless terminal may be acquired by the configuration device, and the wireless terminal receives the configuration triggering information that is sent by the configuration device according to the device identification information of the wireless terminal using a probe response frame or a beacon frame. In addition, before the receiving, by the wireless terminal, configuration triggering information that is sent by the configuration device according to device identification information of the wireless terminal, the method may include sending, by the wireless terminal, a configuration request message to the configuration device. The configuration request message includes the device identification information of the wireless terminal and indication information of using a PIN manner, such that the configuration device receives, according to the configuration request message, configuration password information input by a user. The configuration password information includes a PIN of the wireless terminal. Alternatively, the method comprises sending, by the wireless terminal, a configuration request message to the configuration device, where the configuration request message includes the device identification information of the wireless terminal and indication information of using a PBC manner. The configuration device interacts with the wireless terminal in the PBC configuration manner, and uses a default PIN as configuration password information during the interaction.

S202: The wireless terminal performs verification with the configuration device, such that the configuration device determines that the wireless terminal has ownership of the configuration password information.

Exemplarily, the configuration password information of the wireless terminal may be acquired by the configuration device, and the wireless terminal performs verification with the configuration device using an EAP message.

S203: The wireless terminal receives credential information required for the wireless terminal to access a wireless access device and identification information of the wireless access device that are sent by the configuration device, such that after the verification succeeds, the wireless terminal requests, according to the credential information and the device identification information of the wireless access device, to access the wireless access device.

Exemplarily, the wireless terminal receives the credential information required for the wireless terminal to access the wireless access device and the identification information of the wireless access device that are sent by the configuration device using an EAP message.

It should be noted that, depending on different verification manners and message exchange procedures, step S203 may also be performed concurrently with step S202. This embodiment is not intended to restrict that step S203 has to be performed after step S202 is completed.

After S203 is completed, the wireless terminal can discover the wireless access device according to the identification information of the wireless access device acquired from the configuration device, and after finding the specified wireless access device, the wireless terminal can establish a secure connection with the wireless access device using the acquired credential information.

In the wireless terminal configuration method provided in this embodiment of the present disclosure, configuration for a wireless terminal is completed by means of direct communication between a configuration device and the wireless terminal, such that configuration for the wireless terminal can still be completed without involvement of a wireless access device in the configuration process, and flexibility with the configuration process is thereby increased. The method helps address the problem in the prior art in which all devices need to be in a working state in a configuration process, and when a wireless access device is in an area in which normal communication is not available or a wireless access device is in an offline state, configuration for a wireless terminal cannot be completed.

Figure 3:
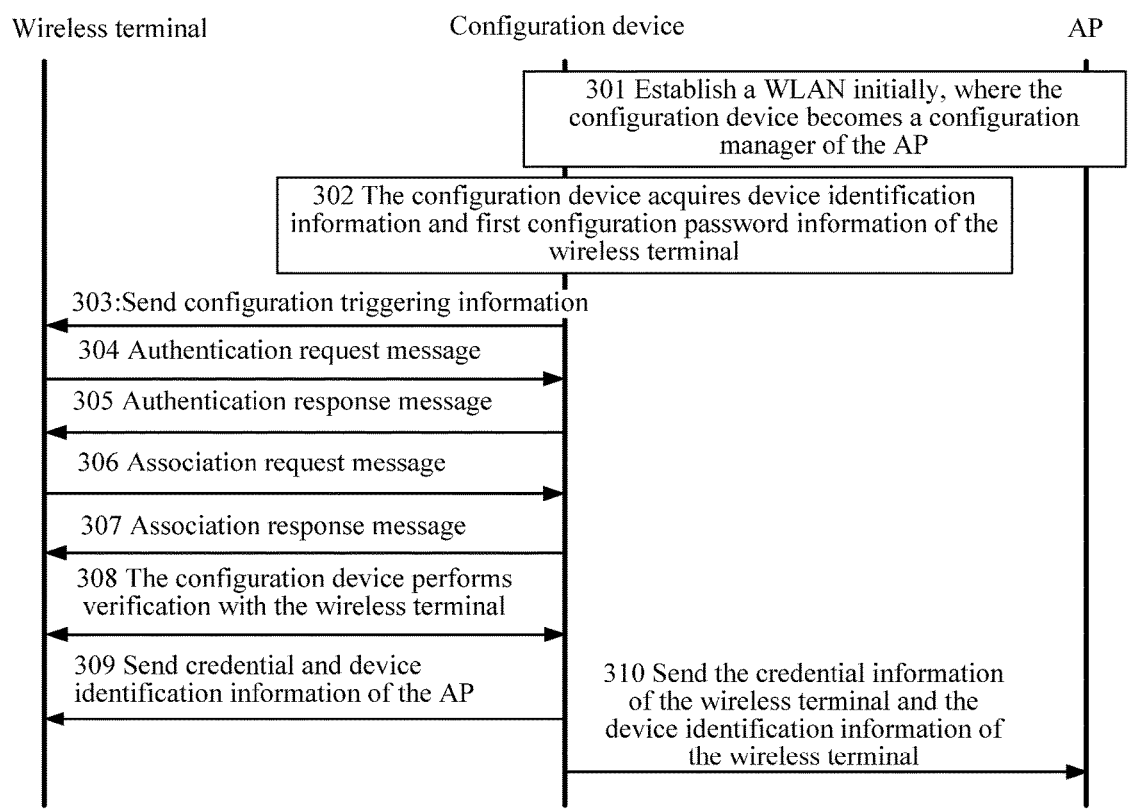
FIG. 3 is a flowchart of another wireless terminal configuration method according to an embodiment of the present disclosure.

The following describes the foregoing method embodiments using a specific embodiment. Referring to FIG. 3, the specific embodiment includes the following steps.

301: Establish a WLAN initially, where a configuration device becomes a configuration manager of a wireless access device.

Exemplarily, this embodiment of the present disclosure may be applied to a Wi-Fi network, which may include a configuration device, a wireless access device, and a wireless terminal, where the configuration device is a configuration management device of the wireless access device configured to manage establishment of a wireless network, and addition and deletion of the wireless terminal. The wireless access device is an access device through which the wireless terminal enters the network, and includes but is not limited to an access point (AP). This embodiment is described using an example in which the wireless access device is an AP. For example, through the AP, the wireless terminal may enter a home network (local area network), or enter the Internet, or enter an enterprise network, or an industry private network (such as an intelligent sensor network, where the wireless terminal is a sensor). In this embodiment, according to functions of the configuration device, the configuration device may be an external registrar, independent of an AP, defined in the existing WPS2.0 standard. It may be understood that, the configuration device is not limited to the external registrar defined in the existing WPS2.0 standard.

Exemplarily, in a process of initially establishing the wireless local area network, the configuration device interacts with the AP and becomes the configuration device of the AP. Preferably, the configuration device may interact with the AP according to the EAP in the WPS standard and become the configuration device of the AP. If the protocol for the configuration device to interact with the AP is changed in the WPS standard, the changed protocol can still be directly applied to this embodiment of the present disclosure.

Alternatively, the configuration device may become the configuration device of the AP by receiving a configuration parameter input by a user, that is to say, the configuration device may become the configuration device of the AP without interaction with the AP.

Preferably, in this embodiment of the present disclosure, in a process of initially establishing the WLAN, the configuration device interacts with the AP and becomes the configuration device of the AP, and is configured to configure another wireless terminal that will need to be added. The interaction process is well known to persons skilled in the art, and details are not described herein again.

302: The configuration device acquires device identification information and first configuration password information of a wireless terminal.

For ease of description, in this embodiment, configuration password information of the wireless terminal acquired by the configuration device is referred to as first configuration password information, and configuration password information possessed by the wireless terminal is referred to as second configuration password information. The first configuration password information and the second configuration password information should be the same. They may fall into the category of PIN or password, and may be encoded into a multi-dimensional code, stored in an NFC label, and displayed in a label or the like as a character string. For example, the multi-dimensional code of the wireless terminal may be a static multi-dimensional code such as a label print multi-dimensional code, or a dynamic multi-dimensional code such as a multi-dimensional code dynamically generated by the wireless terminal. A multi-dimensional code style may be any identifiable, readable one-dimensional barcode or two-dimensional barcode style, for example, a universal product code (UPC) or a quick response code (QR Code). The present disclosure is not limited thereto. The configuration password information of the wireless terminal may be statically stored in an NFC label of the wireless terminal, or be stored in an NFC label of the wireless terminal after being dynamically generated in a particular manner.

The device identification information of the wireless terminal may be any information that can uniquely identify the wireless terminal, which is not limited in this embodiment. For example, the device identification information of the wireless terminal may be a Media Access Control (MAC) address of the wireless terminal.

Exemplarily, the configuration device may acquire the device identification information and the first configuration password information of the wireless terminal by selecting any one of the following manners.

1. The configuration device acquires the configuration password information and the device identification information of the wireless terminal by scanning a multi-dimensional code of the wireless terminal.

2. The configuration device receives a configuration request message of the wireless terminal, where the configuration request message includes the device identification information of the wireless terminal and indication information of using a PIN manner. For example, the configuration device may receive the configuration request message of the wireless terminal using any of the following manners. A. The configuration device broadcasts a beacon frame outward, the wireless terminal sends the configuration request message to the configuration device after receiving the beacon frame, and the configuration device sends a probe reply to the wireless terminal after receiving the configuration request message, thereby acquiring the device identification information of the wireless terminal. B. The wireless terminal proactively sends the configuration request message on each channel, and the configuration device sends a probe reply to the wireless terminal after receiving the configuration request message, thereby acquiring the device identification information of the wireless terminal. The configuration device receives the configuration password information input by a user, where the configuration password information includes a PIN of the wireless terminal.

3. The configuration device receives a configuration request message of the wireless terminal, where the configuration request message includes the device identification information of the wireless terminal and indication information of using a PBC manner. The process for receiving the configuration request message is the same as the configuration request message that includes indication information of using a PIN manner, and no details are described herein again. The configuration device interacts with the wireless terminal in the PBC configuration manner, and uses a default PIN (such as "00000000" specified in the WPS standard) as the configuration password during the interaction.

4. The configuration device reads the configuration password information of the wireless terminal and the device identification information of the wireless terminal using an NFC interface.

303: The configuration device sends configuration triggering information to the wireless terminal.

Depending on different actual interaction manners, the configuration triggering information may be any message that is sent by the configuration device and can trigger the wireless terminal to perform configuration message exchange with the configuration device. For example, the configuration device sends a beacon frame or a probe response message to the wireless terminal according to the device identification information of the wireless terminal, to trigger the wireless terminal to perform subsequent configuration message exchange with the configuration device. The present disclosure is not limited thereto.

308: The configuration device performs verification with the wireless terminal.

309: The configuration device sends a credential and device identification information of the AP to the wireless terminal. For example, the configuration device may send the credential of the wireless terminal and the device identification information of the AP to the wireless terminal using an EAP message, such that the wireless terminal requests to access the AP according to the credential information and the identification information of the AP.

It should be noted that, persons skilled in the art may understand that, step 308 and step 309 may be performed serially or in parallel, largely depending on a verification interaction manner. For example, the credential information and the device identification information of the AP may be sent after the verification process is ended, or may be sent in a verification interaction message, or may be used as one of conditions for determining whether the verification succeeds. The present disclosure is not limited thereto. In addition, the credential information and the device identification information of the AP may be sent together, and may also be sent separately.

310: The configuration device sends credential information of the wireless terminal and the device identification information of the wireless terminal to the AP.

Exemplarily, the configuration device may send a notification message to the AP, where the notification message includes the credential information and the device identification information of the wireless terminal, such that the AP processes the access request of the wireless terminal according to the credential information and the device identification information of the wireless terminal. It should be noted that, step 310 is not limited to being performed immediately after step 308 or step 309 is completed, and time for performing step 310 is determined according to an actual configuration requirement. For example, in a home network, when both the AP and the wireless terminal have been installed, powered on, and ready for service, step 310 may be performed immediately after step 308 or step 309 is completed. In a sensor network, step 310 may be performed a long time after step 308 or step 309 is completed, because a large quantity of sensor devices need to be configured and the sensor devices are scattered after installation, thereby turning configuration after installation into inconvenience and necessitating batch configuration prior to installation.

Exemplarily, in this embodiment, the configuration device and the wireless terminal may use a direct connection manner to perform direct communication, to complete verification by the configuration device and the wireless terminal, where the direct connection manner may include a P2P connection manner and an ad hoc connection manner, and the direct connection manner between the configuration device and the wireless terminal is not limited in this embodiment of the present disclosure. Preferably, in this embodiment, the configuration device and the wireless terminal use a P2P connection manner.

The following step 304 to step 307 are a process in which the wireless terminal and the configuration device complete a P2P connection, and the process may occur between step 303 and step 308, where the configuration device is a group owner (GO) in a P2P connection, and the wireless terminal is a group client in a P2P connection.

304: The wireless terminal sends an authentication request message to the configuration device.

305: The configuration device sends an authentication response message to the wireless terminal.

Exemplarily, the configuration device sends an authentication reply to the wireless terminal, which includes information indicating that a connection is allowed between the wireless terminal and the configuration device.

306: The wireless terminal sends an association request message to the configuration device.

Exemplarily, after receiving the authentication response message, the wireless terminal sends an association request message including connection request information to the configuration device.

307: The configuration device sends an association response message to the wireless terminal.

Exemplarily, the configuration device sends connection information to the wireless terminal according to the received connection request, to complete a P2P connection between the configuration device and the wireless terminal.

It should be noted that, step 304, step 305, step 306, and step 307 are designed in accordance with the existing Institute of Electrical and Electronics Engineers (IEEE) 802.11-2012 protocol.

Figure 4:
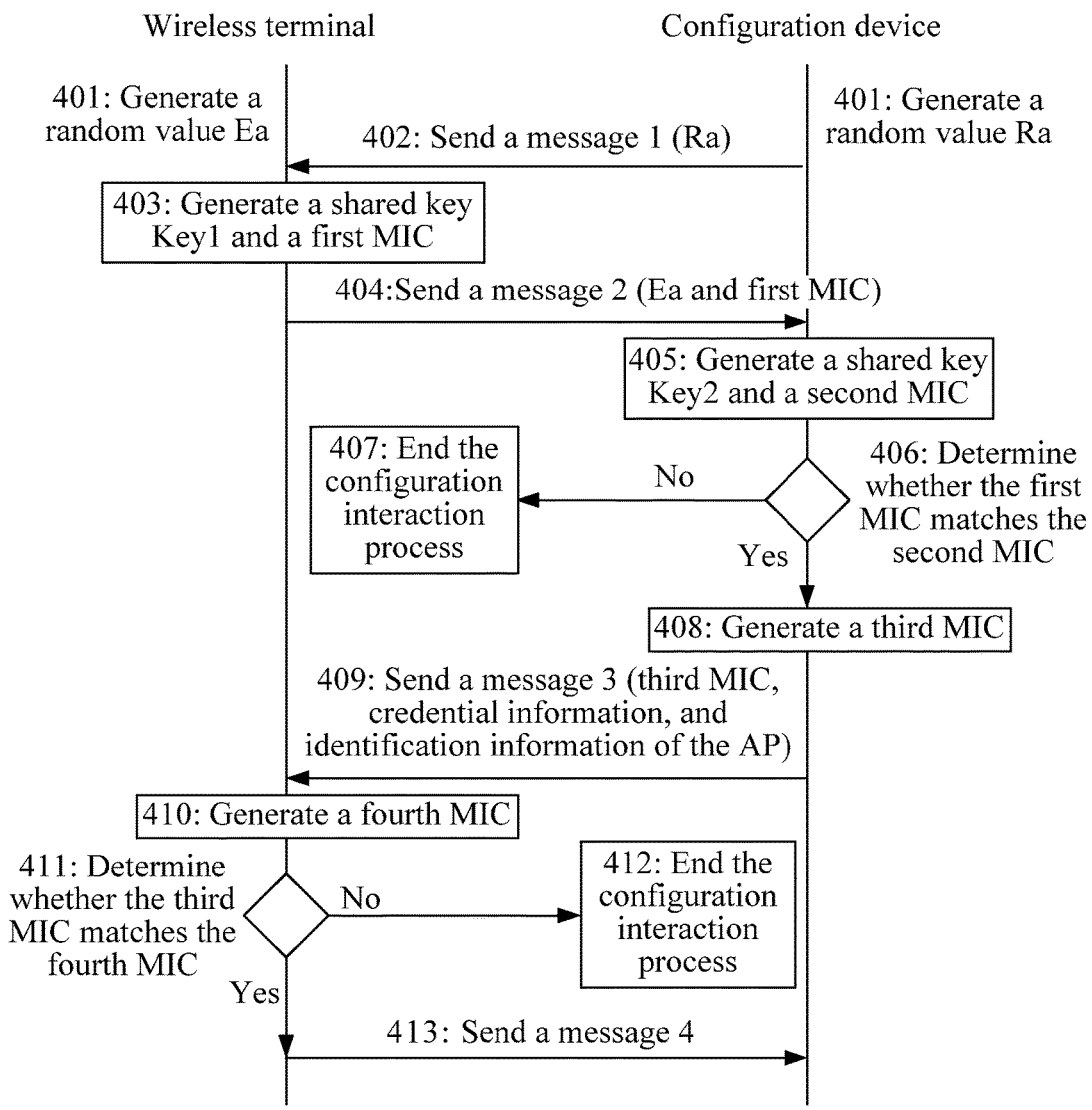
FIG. 4 is a flowchart of a verification method according to an embodiment of the present disclosure.
Figure 5:
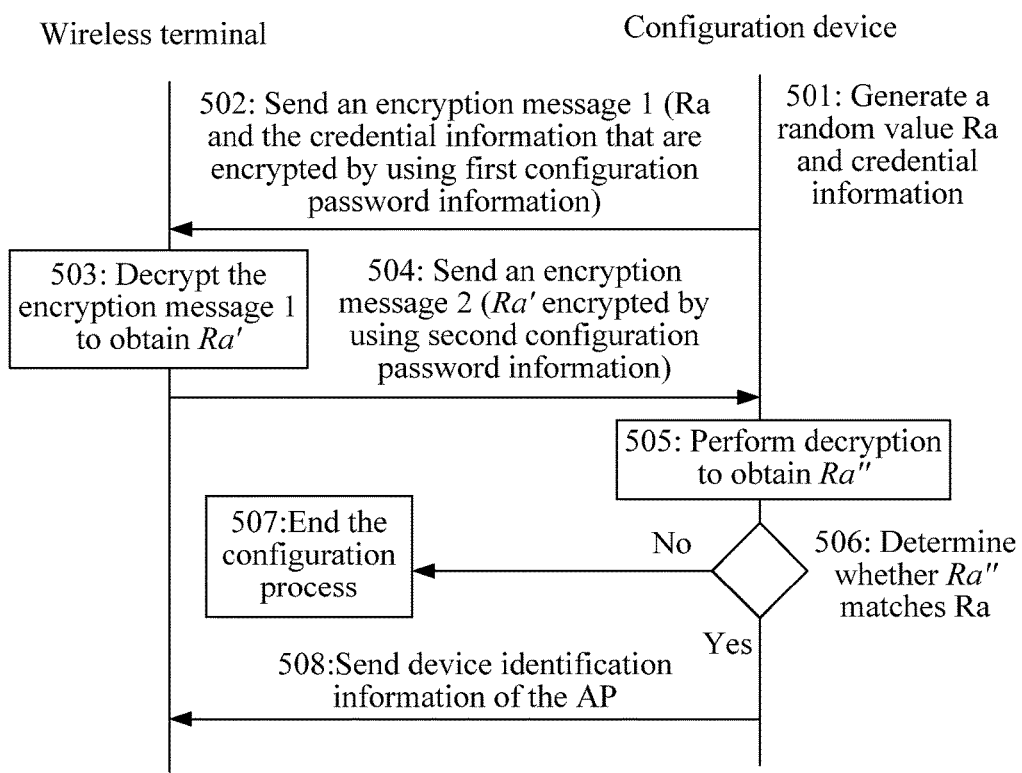
FIG. 5 is a flowchart of another verification method according to an embodiment of the present disclosure.
Figure 6:
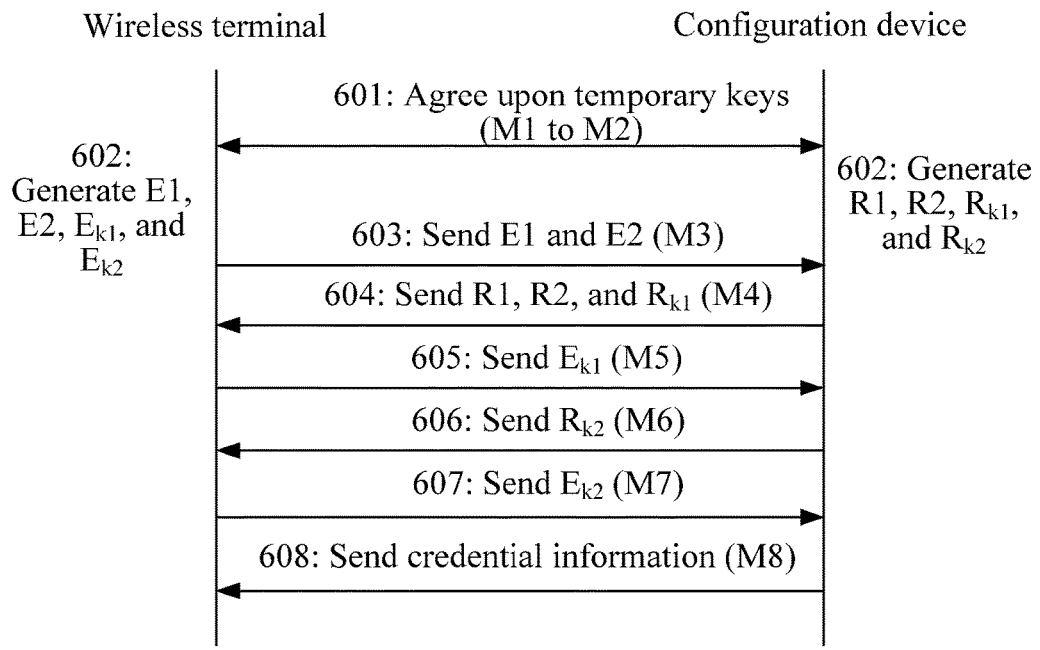
FIG. 6 is a flowchart of another verification method according to an embodiment of the present disclosure.

Exemplarily, referring to FIG. 4 to FIG. 6, in this embodiment of the present disclosure, three types of verification manners are separately described for step 308. 1. The configuration device and the wireless terminal perform a four-way handshake to perform mutual verification, to be specific, the configuration device needs to verify that the wireless terminal has ownership of the first configuration password information acquired by the configuration device, and the wireless terminal also verifies that the configuration device has acquired the second configuration password information of the wireless terminal. 2. The configuration device verifies the wireless terminal unidirectionally, to be specific, the configuration device verifies that the first configuration password information acquired by the configuration device comes from the wireless terminal involved in the configuration process performed by the configuration device. 3. The configuration device and the wireless terminal perform two-way verification using an EAP authentication process in the existing WPS2.0, to be specific, the configuration device needs to verify that the wireless terminal has ownership of the first configuration password information acquired by the configuration device, and the wireless terminal also verifies that the configuration device has acquired the second configuration password information of the wireless terminal. It should be noted that, there may be multiple verification manners, any verification manner in which matching and confirmation are performed by means of information exchange is applicable to the verification process in step 308 in this embodiment of the present disclosure, and the three verification manners provided in this embodiment of the present disclosure are merely used as examples to describe the verification process in detail. The following separately describes the foregoing three verification manners.

Refer to FIG. 4, which shows a detailed process of the first verification method.

401: A configuration device and a wireless terminal each generate a random value, where respective random values are Ra and Ea.

402: The configuration device sends a message 1 to the wireless terminal, where the message 1 includes Ra.

403: The wireless terminal generates a shared key Key1 according to the received Ra, Ea generated by the wireless terminal, and second configuration password information.

404: The wireless terminal sends a message 2 to the configuration device, where the message 2 includes Ea and a first message integrity code (MIC) that is obtained by encrypting a digest of the message 2 using Key1.

405: The configuration device generates a shared key Key2 according to the received Ea, the Ra generated by the configuration device, and first configuration password information, and uses Key2 to generate a second MIC in a same way as the wireless terminal generates Key1.

406: The configuration device determines whether the second MIC matches the first MIC.

407: If the second MIC does not match the first MIC, the configuration interaction process is ended.

Exemplarily, if the second MIC does not match the first MIC, the configuration device determines that the second configuration password information of the wireless terminal is different from the first configuration password information acquired by the configuration device. The configuration device may send result information indicating that the second MIC does not match the first MIC to the wireless terminal, and the wireless terminal sends disconnect information to the configuration device, to end the configuration interaction process. Alternatively, the configuration device directly ends the configuration interaction process, or ends the configuration interaction process in any other feasible manner. The present disclosure is not limited thereto.

408: If the second MIC matches the first MIC, the configuration device encrypts a digest of a message 3 using Key2 to generate a third MIC.

409: The configuration device sends the message 3 to the wireless terminal.

Exemplarily, if the second MIC matches the first MIC, the configuration device determines that the second configuration password information of the wireless terminal is the same as the first configuration password information acquired by the configuration device. The configuration device generates credential information required for the wireless terminal to access an AP. The configuration device sends the message 3 to the wireless terminal, where the message 3 includes the third MIC obtained by encrypting the digest of the message 3 using Key2, and the credential information required for the wireless terminal to access the AP and device identification information of the AP that are encrypted using Key2. It should be noted that, persons skilled in the art may understand that, when to generate the credential information before sending it is not specifically limited.

410: After receiving the message 3, the wireless terminal uses Key1 to generate a fourth MIC in a same way as the configuration device generates an MIC.

411: The wireless terminal determines whether the fourth MIC matches the third MIC.

412: If the fourth MIC does not match the third MIC, the configuration interaction process is ended.

Exemplarily, if the third MIC does not match the fourth MIC, the wireless terminal determines that the first configuration password information acquired by the configuration device is different from the second configuration password information of the wireless terminal. The wireless terminal sends result information indicating that the third MIC does not match the fourth MIC to the configuration device, and the configuration device sends disconnect information to the wireless terminal, to end the configuration interaction process, or directly ends the configuration interaction process, or ends the configuration interaction process in any other feasible manner. The present disclosure is not limited thereto.

413: If the fourth MIC matches the third MIC, the wireless terminal sends a message 4.

Exemplarily, if the third MIC matches the fourth MIC, the wireless terminal determines that the first configuration password information acquired by the configuration device is the same as the second configuration password information of the wireless terminal. The wireless terminal sends the message 4 to the configuration device, to notify the configuration device that matching succeeds, and decrypts, according to Key1, the credential information required for the wireless terminal to access the AP and the device identification information of the AP in the message 3 that are encrypted using Key2, to obtain the credential information and the device identification information of the AP.

It should be noted that, persons skilled in the art may understand that, the identification information of the AP is relatively public, and it is not necessarily required to encrypt the identification information. For example, the identification information of the AP is explicitly carried in the message 3 as plain text, or is sent using another message. This embodiment merely provides a feasible method by way of example, and not by way of limitation.

Refer to FIG. 5, which shows a detailed process of the second verification method 501: A configuration device generates a random value Ra and credential information required for a wireless terminal to access an AP.

Exemplarily, the configuration device may encrypt, using the first configuration password information, the random value Ra and the credential information required for the wireless terminal to access the AP to obtain encryption information 1.

502: The configuration device sends the encryption information 1 to the wireless terminal.

It should be noted that, persons skilled in the art may understand that, when to generate the credential information before sending it is not specifically limited.

503: The wireless terminal decrypts the received encryption information 1 using a second configuration password, to obtain a random value Ra'.

Exemplarily, the wireless terminal may encrypt the random value Ra' using the second configuration password information to obtain encryption information 2.

504: The wireless terminal sends the encryption information 2 to the configuration device.

505: The configuration device decrypts the received encryption information 2 using first configuration password information, to obtain a random value Ra".

506: The configuration device determines whether the random value Ra" matches the random value Ra generated by the configuration device.

507: If the random value Ra" does not match the random value Ra, the configuration interaction process is ended.

Exemplarily, if Ra" does not match Ra, the configuration device may send disconnect information to the wireless terminal, to end the configuration interaction process, or directly end the configuration interaction process, or end the configuration interaction process in any other feasible manner. The present disclosure is not limited thereto.

508: If the random value Ra" matches the random value Ra, the configuration device sends device identification information of the AP to the wireless terminal.

Exemplarily, if Ra" matches Ra, the configuration device determines that the matching succeeds, and sends the device identification information of the AP to the wireless terminal. It should be noted that, the device identification information of the AP may also be encrypted and sent together with the credential information in the foregoing verification process. Alternatively, the device identification information of the AP may also be explicitly sent in the foregoing verification process as plain text. This embodiment of the present disclosure is not limited thereto.

Refer to FIG. 6, which shows a detailed process of the third verification method.

Interaction in this verification method is based on an EAP authentication process involving message 1 to message 8 in the existing WPS2.0 standard. A configuration device and a wireless terminal may complete the configuration process using 8 messages (M1 to M8). Messages M1 to M8 are standard messages in the protocol, and specific content thereof is not described herein again. The process is as follows.

601: The configuration device and the wireless terminal use a dynamic key exchange algorithm to agree upon a set of temporary keys that will be used between the wireless terminal and the configuration device, where the set of temporary keys are used to encrypt subsequent verification interaction messages and important data such as configuration data and credential information, to ensure security of the configuration process.

Exemplarily, a Diffie-Hellman (DH) dynamic key exchange algorithm is preferably used in this embodiment of the present disclosure. However, this does not mean that this embodiment of the present disclosure is merely limited to using the dynamic key exchange algorithm.

602: The configuration device divides first configuration password information into the first half and the second half, and separately encrypts them. Preferably, an Advanced Encryption Standard (AES) algorithm is selected for the encryption in this embodiment of the present disclosure. However, this does not mean that this embodiment of the present disclosure is merely limited to this algorithm. Encryption information of the first half is R1, encryption information of the second half is R2, an encryption key of R1 is $R_{k1}$, and an encryption key of R2 is $R_{k2}$. Correspondingly, the wireless terminal also divides second configuration password information into the first half and the second half, and separately encrypts them using a same encryption algorithm that is also applied to R1 and R2. Encryption information of the first half is E1, encryption information of the second half is E2, an encryption key of E1 is $E_{k1}$, and an encryption key of E2 is E.

603: The wireless terminal sends E1 and E2 to the configuration device.

604: The configuration device sends the encryption information R1 and R2 and the encryption key $R_{k1}$ of the first half of the first configuration password information to the wireless terminal.

605: If it is determined that the first half of the first configuration password information matches the first half of the second configuration password information, the wireless terminal sends $E_{k1}$ to the configuration device.

Exemplarily, the wireless terminal encrypts the first half of the second configuration password information according to $R_{k1}$ using a same encryption algorithm that is also applied to R1 and R2. If a result of the encryption is equal to R1, the wireless terminal determines that the first half of the first configuration password information matches the first half of the second configuration password information, and the wireless terminal sends $E_{k1}$ to the configuration device.

If a result of the encryption is not equal to R1, the wireless terminal determines that the first configuration password information does not match the second configuration password information. In which case, the configuration interaction process is ended. For example, the wireless terminal may send result information indicating that the first configuration password information does not match the second configuration password information to the configuration device, and the configuration device sends disconnect information to the wireless terminal, to end the configuration interaction process, or directly ends the configuration interaction process, or ends the configuration interaction process in any other feasible manner. The present disclosure is not limited thereto.

606: If it is determined that the first half of the first configuration password information matches the first half of the second configuration password information, the configuration device sends the encryption key $R_{k2}$ of the second half of the second configuration password information to the wireless terminal.

Exemplarily, the configuration device encrypts the first half of the first configuration password information according to $E_{k1}$ using a same encryption algorithm that is also applied to R1 and R2. If a result of the encryption is equal to E1, the configuration device determines that the first half of the first configuration password information matches the first half of the second configuration password information, and sends the encryption key $R_{k2}$ of the second half of the second configuration password information to the wireless terminal.

If a result of the encryption is not equal to E1, the configuration device determines that the first configuration password information does not match the second configuration password information. In which case, the configuration interaction process is ended. For example, the configuration device may send result information indicating that the first configuration password information does not match the second configuration password information to the wireless terminal, and the wireless terminal sends disconnect information to the wireless terminal, to end the configuration interaction process, or directly ends the configuration interaction process, or ends the configuration interaction process in any other feasible manner. The present disclosure is not limited thereto.

607: If it is determined that the second half of the first configuration password information matches the second half of the second configuration password information, the wireless terminal sends E to the configuration device.

Exemplarily, the verification process in step 607 is the same as the process of verifying R1 of the first half in step 605, and no details are described herein again.

608: If it is determined that the second half of the first configuration password information matches the second half of the second configuration password information, the configuration device generates credential information required for the wireless terminal to access an AP and sends the credential information to the wireless terminal.

Exemplarily, the verification process in step 608 is the same as the process of verifying E1 of the first half in step 606, and no details are described herein again.

Exemplarily, the credential information may include authentication information of the wireless terminal and a key for encrypting and decrypting a communication message between the AP and the wireless terminal.

Exemplarily, the foregoing three examples of verification methods all are applicable to when configuration password information is a PIN code, or when configuration password information is a password in an NFC label, or when configuration password information is a multi-dimensional code, which is not limited in this embodiment. In an actual implementation, the verification method shown in FIG. 4 and the verification method shown in FIG. 5 exhibit a simple interaction process, but configuration password information needs to convey a large amount of information to ensure security of information transmission. For example, configuration password information in numerical format consists of relatively many digits and consequently is difficult to manually input. For this reason, it would be desirable to acquire configuration password information that is not manually input. For example, configuration password information in an NFC label is read using an NFC interface, or encoded configuration password information in a QR Code is identified and read using an image sensor, such that the configuration device can conveniently acquire the configuration password information without sacrificing information capacity of the configuration password information. If configuration password information is a PIN code input by a user or is configured in a PBC manner, the configuration password information consists of fewer digits. In which case, to ensure security of the configuration password information, the verification method shown in FIG. 6 is preferred, which is an EAP interaction process in the existing WPS2.0 protocol. Persons skilled in the art may understand that, an EAP interaction process in the WPS2.0 standard provides strong security to a PIN code that has only a few of digits.

In the wireless terminal configuration method provided in this embodiment of the present disclosure, configuration for a wireless terminal is completed by means of direct communication between a configuration device and the wireless terminal, such that configuration for the wireless terminal can still be completed without involvement of an AP in the configuration process, and flexibility with the configuration process is thereby increased. The method helps address the problem in the prior art in which all devices need to be in a working state in a configuration process, and when an AP is in an area in which normal communication is not available or an AP is in an offline state, configuration for a wireless terminal cannot be completed.

According to another aspect, an embodiment of the present disclosure provides a configuration device 70, where the configuration device 70 may be applied to a Wi-Fi network, and the Wi-Fi network may further include a wireless access device and a wireless terminal. The configuration device 70 may be a configuration management device of the wireless access device configured to manage establishment of a wireless network, and addition and deletion of the wireless terminal. The wireless access device is an access device through which the wireless terminal enters the network, and includes but is not limited to an AP. This embodiment is described using an example in which the wireless access device is an AP. For example, through the AP, the wireless terminal may enter a home network (local area network), or enter the Internet, or enter an enterprise network, or an industry private network (such as an intelligent sensor network, where the wireless terminal is a sensor). In this embodiment, according to functions of the configuration device 70, the configuration device 70 may be an external registrar, independent of an AP, defined in the existing WPS2.0 standard. It may be understood that, the configuration device 70 is not limited to the external registrar defined in the existing WPS2.0 standard.

Figure 7:
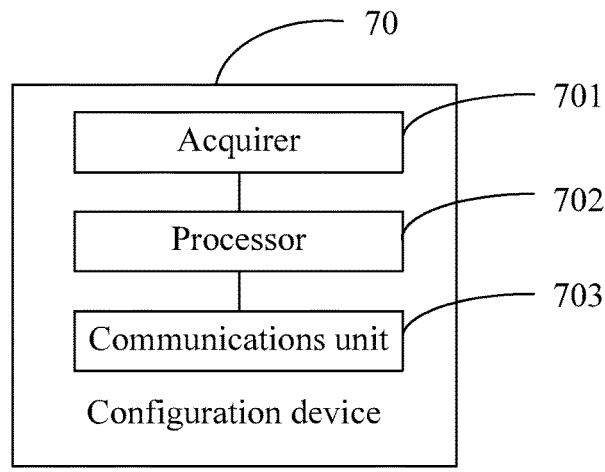
FIG. 7 is an apparatus diagram of a configuration device according to an embodiment of the present disclosure.

Referring to FIG. 7, the configuration device 70 includes an acquirer 701 configured to acquire configuration password information and transmit the configuration password information to a processor 702. The processor 702 is configured to generate configuration triggering information according to the configuration password information. The processor 702 is configured to perform verification with the wireless terminal according to the configuration password information, and to determine that the wireless terminal has ownership of the configuration password information. A communications unit 703, communicating with an external network element using a direct connect communication link, and configured to send the configuration triggering information to the wireless terminal according to device identification information of the wireless terminal.

Exemplarily, the communicating, by the communications unit 703, with an external network element using a direct connect communication link may include communicating, by the communications unit 703, with an external network element using a P2P connection link or an ad hoc connection link, which is not limited in this embodiment of the present disclosure. Preferably, in this embodiment, the communications unit 703 communicates with an external network element using a P2P connection link. The configuration device 70 is a GO in a P2P connection, and the wireless terminal is a client in a P2P connection.

Optionally, a P2P connection process is as follows: the communications unit 703 receives an authentication request message sent by the wireless terminal. The processor 702 generates an authentication reply message according to the authentication request message, where the authentication reply message includes information indicating that a connection is allowed between the wireless terminal and the configuration device 70. The communications unit 703 sends the authentication reply message to the wireless terminal. The communications unit 703 receives an association request message sent by the wireless terminal. The processor 702 generates an association response message according to the association request message. The communications unit 703 sends the association response message to the wireless terminal, to complete a P2P connection between the configuration device 70 and the wireless terminal.

It should be noted that, the foregoing authentication and association processes are designed according to the existing IEEE802.11-2012 standard.

Exemplarily, for ease of description, in this embodiment, configuration password information of the wireless terminal acquired by the acquirer 701 is referred to as first configuration password information, and configuration password information possessed by the wireless terminal is referred to as second configuration password information. The first configuration password information and the second configuration password information should be the same. They may fall into the category of PIN or password, and may be encoded into a multi-dimensional code, stored in an NFC label, and displayed in the label or the like as a character string. For example, the multi-dimensional code of the wireless terminal may be a static multi-dimensional code such as a label print multi-dimensional code, or a dynamic multi-dimensional code such as a multi-dimensional code dynamically generated by the wireless terminal. A multi-dimensional code style may be any identifiable, readable one-dimensional barcode or two-dimensional barcode style, for example, a UPC or a QR Code. The present disclosure is not limited thereto. The configuration password information of the wireless terminal may be statically stored in an NFC label of the wireless terminal, or be stored in an NFC label of the wireless terminal after being dynamically generated in a particular manner.

The device identification information of the wireless terminal may be any information that can uniquely identify the wireless terminal, which is not limited in this embodiment. For example, the device identification information of the wireless terminal may be a MAC address of the wireless terminal.

Depending on different types of configuration password information, the acquirer 701 may be different types of devices to acquire configuration password information, for example, a keyboard that receives user input, a PBC button, a NFC interface reading NFC label information, and a scanner scanning information about a multi-dimensional code. Acquirers of different device types correspond to different types of configuration password information, which is as follows.

1. The acquirer 701 is a multi-dimensional code scanner configured to scan a multi-dimensional code on the wireless terminal device to acquire the configuration password information and the device identification information of the wireless terminal.

2. The acquirer 701 is a keyboard configured to receive the configuration password information input by a user, where the configuration password information includes a PIN of the wireless terminal.

Exemplarily, when the acquirer 701 is a keyboard, the communications unit 703 may be further configured to receive a configuration request message sent by the wireless terminal, where the configuration request message includes the device identification information of the wireless terminal and indication information of using a PIN manner, where the configuration request message sent by the wireless terminal may be received in any of the following manners. A. The communications unit 703 receives the configuration request message that is sent by the wireless terminal to the configuration device 70 after receiving a beacon frame broadcast outward by the configuration device 70, and sends a probe reply to the wireless terminal, thereby acquiring the device identification information of the wireless terminal. B. The communications unit 703 receives the configuration request message that is proactively sent on each channel by the wireless terminal, and sends a probe reply to the wireless terminal according to the configuration request message, thereby acquiring the device identification information of the wireless terminal.

3. The acquirer 701 is a PBC button configured to interact with the wireless terminal in a PBC configuration manner and use a default PIN (such as "00000000" specified in the WPS standard, which is not limited thereto in this embodiment of the present disclosure) as the configuration password during the interaction. The process of receiving a configuration request message is the same as the process of receiving the configuration request message that includes indication information of using a PIN manner, and no details are described herein again.

Exemplarily, when the acquirer 701 is a PBC button, the communications unit 703 may be further configured to receive a configuration request message of the wireless terminal, where the configuration request message includes the device identification information of the wireless terminal and indication information of using a PBC manner.

4. The acquirer 701 is an NFC interface configured to read the configuration password information of the wireless terminal and the device identification information of the wireless terminal.

The processor 702 is configured to perform verification with the wireless terminal according to the first configuration password information, to determine that the wireless terminal has ownership of second configuration password information that is the same as the first configuration password information.

The communications unit 703 is further configured to send credential information required for accessing the AP and device identification information of the AP to the wireless terminal, such that after the verification succeeds, the wireless terminal requests, according to the credential information and the device identification information of the AP, to access the AP. The communications unit 703 is further configured to send the credential information of the wireless terminal and the device identification information of the wireless terminal to the AP, such that the AP processes, according to the credential information of the wireless terminal and the identification information of the wireless terminal, the request of the wireless terminal to access the AP.

Optionally, the configuration device 70 may further include a memory configured to store the first configuration password information, the credential information of the wireless terminal, the device identification information of the wireless terminal, and the device identification information of the AP, where the memory may include a high speed random access memory (RAM), and may also include a non-volatile memory, for example, a memory, a buffer, a register, a disk memory, or a flash memory.

Exemplarily, in a process of initially establishing a wireless local area network, the configuration device 70 may interact with the AP and become a configuration device of the AP. Preferably, the processor 702 may interact with the AP according to the EAP protocol in the WPS standard and become a configuration device of the AP. If the protocol for the configuration device to interact with the AP is changed in the WPS standard, the changed protocol can still be directly applied to this embodiment of the present disclosure.

Alternatively, the communications unit 703 may receive a configuration parameter input by a user, such that the configuration device 70 becomes a configuration device of the AP and is configured to configure another wireless terminal that will need to be added. The interaction process is well known to persons skilled in the art, and details are not described herein again.

Exemplarily, the communications unit 703 sends the configuration triggering information to the wireless terminal by broadcasting a beacon frame or probe response frame including the device identification information of the wireless terminal, where the configuration triggering information is used to trigger verification toward the wireless terminal, and is not limited in this embodiment of the present disclosure. Depending on different actual interaction manners, the configuration triggering information may be any message that is sent by the configuration device 70 and can trigger the wireless terminal to perform configuration message exchange with the configuration device 70. For example, the configuration device 70 sends a probe response message to the wireless terminal according to the device identification information of the wireless terminal, to trigger the wireless terminal to perform subsequent configuration message exchange with the configuration device 70. The present disclosure is not limited thereto.

Exemplarily, the processor 702 performs verification with the wireless terminal according to the first configuration password information using an EAP message, to determine that the wireless terminal has ownership of the second configuration password information that is the same as the first configuration password information, where the processor 702 may use different verification methods for the wireless terminal. The following describes processes of three verification methods in detail. 1. The processor 702 and the wireless terminal perform a four-way handshake to perform mutual verification, to be specific, the configuration device 70 needs to verify that the wireless terminal has ownership of the first configuration password information acquired by the configuration device 70, and the wireless terminal also verifies that the configuration device 70 has acquired the second configuration password information of the wireless terminal. 2. The processor 702 verifies the wireless terminal unidirectionally, to be specific, the configuration device 70 verifies that the first configuration password information acquired by the configuration device 70 comes from the wireless terminal involved in the configuration process performed by the configuration device 70. 3. The processor 702 and the wireless terminal perform two-way verification using an EAP authentication process in the existing WPS2.0, to be specific, the configuration device 70 needs to verify that the wireless terminal has ownership of the first configuration password information acquired by the configuration device 70, and the wireless terminal also verifies that the configuration device 70 has acquired the second configuration password information of the wireless terminal. It should be noted that, there may be multiple verification manners, and any verification manner in which matching and confirmation are performed by means of information exchange is applicable to the verification process in this embodiment of the present disclosure. The three verification manners provided in this embodiment of the present disclosure are merely used as examples to describe the verification process in detail. The following separately describes the foregoing three verification manners.

Method 1:

A. The processor 702 and the wireless terminal may each generate a random value, where respective random values are Ra and Ea. The communications unit 703 sends a message 1, where the message 1 includes Ra, and the communications unit 703 receives a message 2 sent by the wireless terminal, where the message 2 includes Ea and a first MIC that is obtained by the wireless terminal by encrypting a digest of the message 2 using Key1.

B. The processor 702 generates a shared key Key2 according to the received Ea, the Ra generated by the processor 702, and the first configuration password information, where a manner for the processor 702 to generate Key2 is the same as the manner for the wireless terminal to generate Key1. The processor 702 uses Key2 to generate a second MIC in a same manner as the wireless terminal generates the first MIC, and determines whether the second MIC matches the first MIC.

If the second MIC does not match the first MIC, the processor 702 ends the configuration interaction process. For example, if the second MIC does not match the first MIC, the processor 702 determines that the second configuration password information of the wireless terminal is different from the first configuration password information acquired by the configuration device 70. In which case, the processor 702 generates result information indicating that the second MIC does not match the first MIC, the communications unit 703 sends the result information indicating that the second MIC does not match the first MIC to the wireless terminal. The communications unit 703 receives disconnect information sent by the wireless terminal to the configuration device 70, to end the configuration interaction process. Alternatively, the processor 702 may directly end the configuration interaction process.

If the second MIC matches the first MIC, the processor 702 encrypts a digest of a message 3 using Key2 to generate a third MIC, and the communications unit 703 sends the message 3 to the wireless terminal. For example, if the second MIC matches the first MIC, the processor 702 determines that the second configuration password information of the wireless terminal is the same as the first configuration password information acquired by the configuration device 70. The processor 702 generates the credential information required for the wireless terminal to access the AP. The communications unit 703 sends the message 3 to the wireless terminal, where the message 3 includes the third MIC obtained by encrypting the digest of the message 3 using Key2, and the credential information required for the wireless terminal to access the AP and the device identification information of the AP that are encrypted using Key2, such that the wireless terminal side generates, according to Key2, a fourth MIC that is to be matched against the third MIC. It should be noted that, persons skilled in the art may understand that, when to generate the credential information before sending it is not specifically limited.

C. If the third MIC on the wireless terminal side matches the fourth MIC, the communications unit 703 receives information that is sent by the wireless terminal to indicate that the matching succeeds.

It should be noted that, persons skilled in the art may understand that, the identification information of the AP is relatively public, and it is not necessarily required to encrypt the identification information. For example, the identification information of the AP is explicitly carried in the message 3 as plain text, or is sent using another message. This embodiment merely provides a feasible method by way of example, and not by way of limitation.

Method 2:

A. The processor 702 generates a random value Ra and the credential information required for the wireless terminal to access the AP. For example, the processor 702 may encrypt, using the first configuration password information, the random value Ra and the credential information required for the wireless terminal to access the AP to obtain encryption information 1.

B. The communications unit 703 sends the encryption information 1 to the wireless terminal. It should be noted that, persons skilled in the art may understand that, when to generate the credential information before sending it is not specifically limited.

C. The communications unit 703 receives an encryption message 2 sent by the wireless terminal, where the encryption message 2 is obtained by the wireless terminal by encrypting a random value Ra' using the second configuration password information, where the random value Ra' is decrypted from the received encryption information 1 using the second configuration password information.

D. The processor 702 decrypts the received encryption information 2 using the first configuration password information, and matches a random value Ra" obtained after the decryption against the random value Ra generated by the processor 702.

If the two do not match, the processor 702 ends the configuration interaction process. For example, if Ra" does not match Ra, the communications unit 703 sends disconnect information to the wireless terminal, to end the configuration interaction process, or directly ends the configuration interaction process.

If Ra" matches Ra, the processor 702 determines that the matching succeeds, and the communications unit 703 sends the device identification information of the AP to the wireless terminal. It should be noted that, the device identification information of the AP may also be encrypted and sent together with the credential information in the foregoing verification process. Alternatively, the device identification information of the AP may also be explicitly sent in the foregoing verification process as plain text. This embodiment of the present disclosure is not limited thereto.

Method 3: Interaction in this verification method is based on an EAP authentication process involving message 1 to message 8 in the existing WPS2.0 standard. The configuration device 70 and the wireless terminal may complete the configuration process using 8 messages (M1 to M8). Messages M1 to M8 are standard messages in the protocol, and specific content thereof is not described herein again. The process is as follows.

A. The processor 702 and the wireless terminal use a dynamic key exchange algorithm to agree upon a set of temporary keys that will be used between the wireless terminal and the configuration device 70. The set of temporary keys are used to encrypt subsequent verification interaction messages and important data such as configuration data and credential information, to ensure security of the configuration process. For example, a DH dynamic key exchange algorithm is preferably used in this embodiment of the present disclosure. However, this does not mean that this embodiment of the present disclosure is merely limited to using the dynamic key exchange algorithm.

B. The processor 702 divides the first configuration password information into the first half and the second half, and separately encrypts them. Preferably, an AES algorithm is selected for encryption in this embodiment of the present disclosure. However, this does not mean that this embodiment of the present disclosure is merely limited to this algorithm. Encryption information of the first half is R1, encryption information of the second half is R2, an encryption key of R1 is $R_{k1}$, and an encryption key of R2 is $R_{k2}$. Correspondingly, the wireless terminal also divides the second configuration password information into the first half and the second half, and separately encrypts them using a same encryption algorithm that is also applied to R1 and R2. Encryption information of the first half is E1, encryption information of the second half is E2, an encryption key of E1 is $E_{k1}$, and an encryption key of E2 is E.

C. The communications unit 703 receives E1 and E2 that are sent by the wireless terminal to the configuration device 70, and sends the encryption information R1 and R2 and $R_{k1}$ to the wireless terminal, such that the wireless terminal can encrypt the first half of the second configuration password information according to $R_{k1}$ using a same encryption algorithm that is also applied to R1 and R2. If a result of the encryption is equal to R1, the wireless terminal determines that the first half of the first configuration password information matches the first half of the second configuration password information, and the communications unit 703 receives $E_{k1}$ sent by the wireless terminal. If a result of the encryption is not equal to R1, the wireless terminal determines that the first configuration password information does not match the second configuration password information. In which case, the configuration interaction process is ended. For example, the communications unit 703 receives result information that is sent by the wireless terminal to the configuration device 70 to indicate that the first configuration password information does not match the second configuration password information. The processor 702 generates disconnect information, and the communications unit 703 sends the disconnect information to the wireless terminal, to end the configuration interaction process. Alternatively, the processor 702 directly ends the configuration interaction process.

D. If it is determined that the first half of the first configuration password information matches the first half of the second configuration password information, the communications unit 703 sends the encryption key $R_{k2}$ of the second half of the second configuration password information to the wireless terminal. For example, the processor 702 encrypts the first half of the first configuration password information according to $E_{k1}$ using a same encryption algorithm that is also applied to R1 and R2. If a result of the encryption is equal to E1, it is determined that the first half of the first configuration password information matches the first half of the second configuration password information. In such a case, the encryption key $R_{k2}$ of the second half of the second configuration password information is sent to the wireless terminal, such that the wireless terminal can calculate the second half of the second configuration password information according to $R_{k2}$. If a result of the encryption is equal to R2, the wireless terminal determines that the second half of the first configuration password information matches the second half of the second configuration password information, and sends $E_{k2}$ to the configuration device 70. If an encryption result is not equal to E1, the processor 702 determines that the first configuration password information does not match the second configuration password information. In which case, the configuration interaction process is ended. For example, the processor 702 generates result information indicating that the first configuration password information does not match the second configuration password information, and the communications unit 703 sends the result information indicating that the first configuration password information does not match the second configuration password information to the wireless terminal. The wireless terminal sends disconnect information to the wireless terminal, to end the configuration interaction process, or the processor 702 directly ends the configuration interaction process.

E. If it is determined that the second half of the first configuration password information matches the second half of the second configuration password information, the processor 702 generates the credential information required for the wireless terminal to access the AP, and the communications unit 703 sends the credential information required for the wireless terminal to access the AP to the wireless terminal.

Exemplarily, the process of verifying the second half is the same as the process of verifying E1 of the first half, and no details are described herein again.

Exemplarily, the credential information may include authentication information of the wireless terminal and a key for encrypting and decrypting a communication message between the AP and the wireless terminal.

Exemplarily, the foregoing three examples of verification methods all are applicable to when configuration password information is a PIN code, or when configuration password information is a password in an NFC label, or when configuration password information is a multi-dimensional code, which is not limited in this embodiment. In an actual implementation, the method 1 and the method 2 exhibit a simple interaction process, but configuration password information needs to convey a large amount of information to ensure security of information transmission. For example, configuration password information in numerical format needs to consist of relatively many digits and consequently is difficult to manually input. For this reason, it would be desirable to acquire configuration password information that is not manually input. For example, configuration password information in an NFC label is read using an NFC interface, or encoded configuration password information in a QR Code is identified and read using an image sensor, such that the configuration device 70 can conveniently acquire the configuration password information without sacrificing information capacity of the configuration password information. When configuration password information is a PIN code input by a user or is configured in a PBC manner, the configuration password information consists of fewer digits to ensure security of the configuration password information. In which case, the method 3 is preferred, which is an EAP interaction process in the existing WPS2.0 standard. Persons skilled in the art may understand that, an EAP interaction process in the WPS2.0 standard provides strong security to a PIN code that has only a few of digits.

Exemplarily, when verification by the processor 702 succeeds, the communications unit 703 may send the credential information required for the wireless terminal to access the AP and the device identification information of the AP to the wireless terminal using an EAP message, such that the wireless terminal requests to access the AP according to the credential information and the device identification information of the AP. It should be noted that, persons skilled in the art may understand that, the credential information and the device identification information of the AP may be sent after the verification process is ended, or may be sent in a verification interaction message, or may be used as one of conditions for determining whether the verification succeeds. The present disclosure is not limited thereto. In addition, the credential information and the device identification information of the AP may be sent together, and may also be sent separately.

Exemplarily, the communications unit 703 sends the credential information of the wireless terminal and the device identification information of the wireless terminal to the AP, such that the AP processes, according to the credential information of the wireless terminal and the identification information of the wireless terminal, the request of the wireless terminal to access the AP. It should be noted that, when to send the credential information and the identification information of the wireless terminal to the AP is determined according to an actual configuration requirement. For example, in a home network, when the AP and the wireless terminal both have been installed, powered on, and ready for service, the credential information and the identification information of the wireless terminal to the AP may be sent immediately after the verification succeeds. In a sensor network, the credential information and the identification information of the wireless terminal may be sent to the AP a long time after the processor 702 completes verification for the wireless terminal, because a large quantity of sensor devices need to be configured and the sensor devices are scattered after installation, turning configuration after installation into inconvenience, and necessitating batch configuration before installation.

This embodiment of the present disclosure provides a configuration device 70 for configuring a wireless terminal. Configuration for a wireless terminal is completed by means of direct communication between the configuration device 70 and the wireless terminal, such that configuration for the wireless terminal can still be completed without involvement of an AP in the configuration process, and flexibility with the configuration process is thereby increased. The configuration device helps address the problem in the prior art in which all devices need to be in a working state in a configuration process, and when an AP is in an area in which normal communication is not available or an AP is in an offline state, configuration for a wireless terminal cannot be completed.

According to still another aspect, an embodiment of the present disclosure provides another configuration device 70, where the configuration device 70 may be applied to a Wi-Fi network, and the Wi-Fi network may further include a wireless access device and a wireless terminal. The configuration device 70 may be a configuration management device of the wireless access device configured to manage establishment of a wireless network, and addition and deletion of the wireless terminal. The wireless access device is an access device through which the wireless terminal enters the network, and includes but is not limited to an AP. This embodiment is described using an example in which the wireless access device is an AP. For example, through the AP, the wireless terminal may enter a home network (local area network), or enter the Internet, or enter an enterprise network, or an industry private network (such as an intelligent sensor network, where the wireless terminal is a sensor). In this embodiment, according to functions of the configuration device 70, the configuration device 70 may be an external registrar, independent of an AP, defined in the existing WPS2.0 standard. It may be understood that, the configuration device 70 is not limited to the external registrar defined in the existing WPS2.0 standard. For example, in a process of initially establishing a wireless local area network, the configuration device 70 may negotiate with the AP and become a configuration device of the AP.

For example, the configuration device 70 may interact with the AP according to the EAP protocol in the WPS standard and become the configuration device of the AP. If the protocol for the configuration device to interact with the AP is changed in the WPS standard, the changed protocol can still be directly applied to this embodiment of the present disclosure.

Alternatively, the configuration device 70 may become the configuration device of the AP by receiving a configuration parameter input by a user, and is configured to configure another wireless terminal that will need to be added. The interaction process is well known to persons skilled in the art, and details are not described herein again.

Exemplarily, in this embodiment, the configuration device 70 and the wireless terminal may use a direct connection manner to perform direct communication, to complete verification performed by the configuration device 70 on the wireless terminal, where the direct connection manner may include a P2P connection manner or an ad hoc connection manner, and the direct connection manner between the configuration device and the wireless terminal is not limited in this embodiment of the present disclosure. Preferably, in this embodiment, the configuration device and the wireless terminal use a P2P connection manner. The configuration device 70 is a GO in a P2P connection, and the wireless terminal is a client in a P2P connection. The process of implementing a P2P connection by the configuration device 70 and the wireless terminal has been described in detail in the method embodiments, and no details are described herein again.

Figure 8:
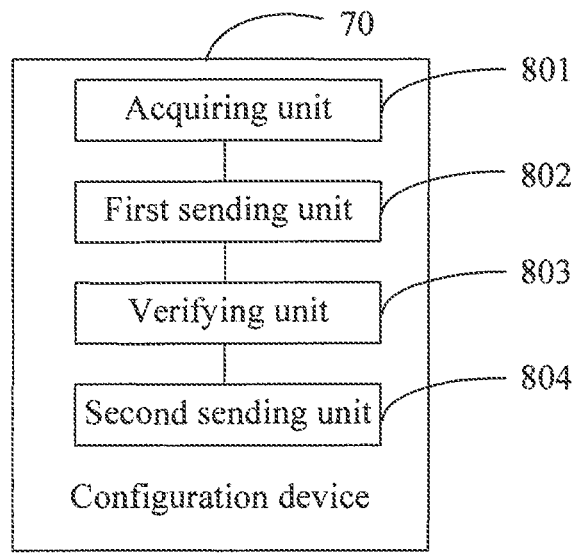
FIG. 8 is an apparatus diagram of another configuration device according to an embodiment of the present disclosure.

Referring to FIG. 8, the configuration device 70 includes an acquiring unit 801, a first sending unit 802, a verifying unit 803, and a second sending unit 804.

The acquiring unit 801 is configured to acquire device identification information and configuration password information of the wireless terminal, and transmit the device identification information of the wireless terminal to the first sending unit 802 and transmit the first configuration password information of the wireless terminal to the verifying unit 803.

Exemplarily, for ease of description, in this embodiment, configuration password information of the wireless terminal acquired by the acquiring unit 801 is referred to as first configuration password information, and configuration password information possessed by the wireless terminal is referred to as second configuration password information. The first configuration password information and the second configuration password information should be the same. They fall into the category of PIN or password, and may be encoded into a multi-dimensional code, stored in an NFC label, and displayed in a label or the like as a character string. For example, the multi-dimensional code of the wireless terminal may be a static multi-dimensional code such as a label print multi-dimensional code, or a dynamic multi-dimensional code such as a multi-dimensional code dynamically generated by the wireless terminal. A multi-dimensional code style may be any identifiable, readable one-dimensional barcode or two-dimensional barcode style, for example, a UPC or a QR Code. The present disclosure is not limited thereto. The configuration password information of the wireless terminal may be statically stored in an NFC label of the wireless terminal, or be stored in an NFC label of the wireless terminal after being dynamically generated in a particular manner.

The device identification information of the wireless terminal may be any information that can uniquely identify the wireless terminal, which is not limited in this embodiment. For example, the device identification information of the wireless terminal may be a MAC address of the wireless terminal. Correspondingly, the acquiring unit 801 may be configured to acquire the configuration password information and the device identification information of the wireless terminal by scanning a multi-dimensional code on the wireless terminal device.

Figure 9:
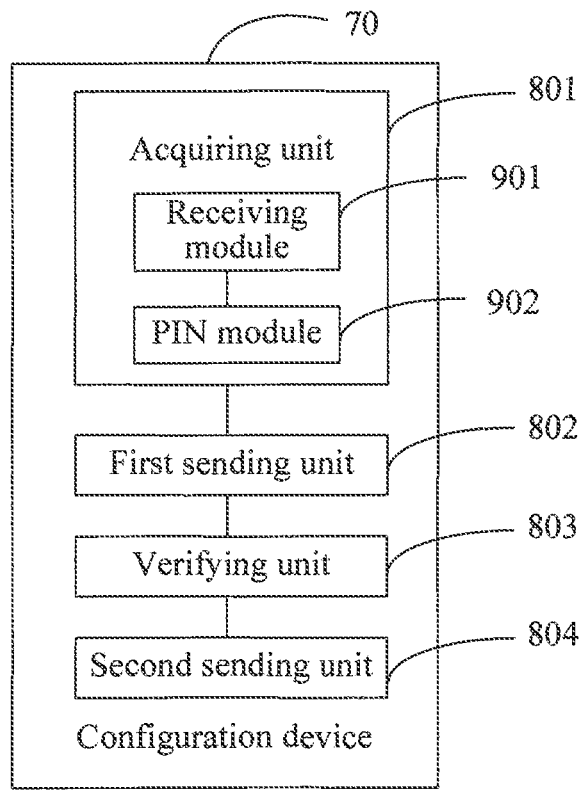
FIG. 9 is an apparatus diagram of another configuration device according to an embodiment of the present disclosure.

Alternatively, as shown in FIG. 9, the acquiring unit 801 may include a receiving module 901 and a PIN module 902.

The receiving module 901 is configured to receive a configuration request message of the wireless terminal, where the configuration request message includes device identification information of the wireless terminal and indication information of using a PIN manner, and the configuration request message of the wireless terminal may be received in any of the following manners.

A. The receiving module 901 receives the configuration request message that is sent by the wireless terminal to the configuration device 70 after receiving a beacon frame broadcast outward by the configuration device 70, and sends a probe reply to the wireless terminal, thereby acquiring the device identification information of the wireless terminal.

B. The receiving module 901 receives the configuration request message that is proactively sent on each channel by the wireless terminal, and sends a probe reply to the wireless terminal according to the configuration request message, thereby acquiring the device identification information of the wireless terminal.

The PIN module 902 is configured to receive the configuration password information input by a user, where the configuration password information includes a PIN of the wireless terminal.

Figure 10:
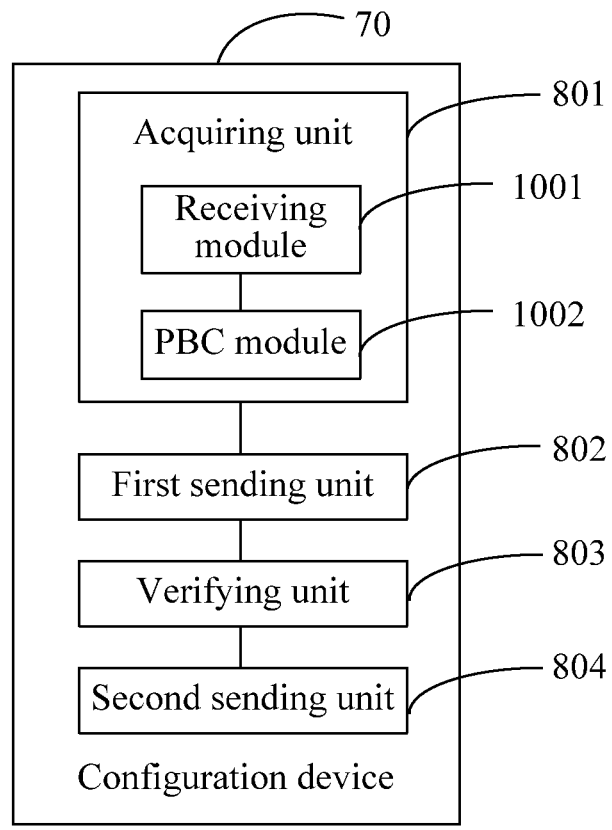
FIG. 10 is an apparatus diagram of another configuration device according to an embodiment of the present disclosure.

Alternatively, as shown in FIG. 10, the acquiring unit 801 may include a receiving module 1001 configured to receive a configuration request message of the wireless terminal, where the configuration request message includes device identification information of the wireless terminal and indication information of using a PBC manner. The process for receiving the configuration request message is the same as the process for receiving the configuration request message that includes indication information of using a PIN manner, and no details are described herein again. A PBC module 1002 configured to interact with the wireless terminal in the PBC configuration manner and use a default PIN (such as "00000000" specified in the WPS standard, which is not limited in this embodiment of the present disclosure) as the configuration password during the interaction.

Alternatively, the acquiring unit 801 may be configured to read the configuration password information of the wireless terminal and the device identification information of the wireless terminal using an NFC interface.

The first sending unit 802 is configured to receive the device identification information of the wireless terminal from the acquiring unit 801 and send configuration triggering information to the wireless terminal according to the device identification information of the wireless terminal using a direct connect communication link. For example, the first sending unit 802 may send the configuration triggering information to the wireless terminal by broadcasting a beacon frame or probe response frame including the device identification information of the wireless terminal, where the configuration triggering information is used to trigger verification toward the wireless terminal. Depending on different actual interaction manners, the configuration triggering information may be any message that is sent by the configuration device 70 and can trigger the wireless terminal to perform configuration message exchange with the configuration device 70. For example, the configuration device 70 sends a probe response message to the wireless terminal according to the device identification information of the wireless terminal, to trigger the wireless terminal to perform subsequent configuration message exchange with the configuration device 70. The present disclosure is not limited thereto.

The verifying unit 803 is configured to receive the first configuration password information from the acquiring unit 801, and perform verification on the wireless terminal using the direct connect communication link according to the first configuration password information, to determine that the wireless terminal has ownership of second configuration password information that is the same as first configuration password information. For example, the verifying unit 803 performs verification on the wireless terminal according to the first configuration password information using an EAP message.

The first sending unit 802 is further configured to send credential information required for the wireless terminal to access an AP and device identification information of the AP to the wireless terminal using the direct connect communication link, such that after the verification succeeds, the wireless terminal requests, according to the credential information and the device identification information of the AP, to access the AP. For example, the first sending unit 802 sends the credential information required for the wireless terminal to access the AP and the device identification information of the AP to the wireless terminal using an EAP message. Persons skilled in the art may understand that, the credential information and the device identification information of the AP may be sent after the verification process is ended, or may be sent in a verification interaction message, or may be used as one of conditions for determining whether the verification succeeds. The present disclosure is not limited thereto. In addition, the credential information and the device identification information of the AP may be sent together, and may also be sent separately.

The second sending unit 804 is configured to receive the device identification information of the wireless terminal from the acquiring unit 801, and send the credential information of the wireless terminal and the device identification information of the wireless terminal to the AP, such that the AP processes, according to the credential information of the wireless terminal and the device identification information of the wireless terminal, the request of accessing the AP by the wireless terminal. For example, when to send the credential information and the identification information of the wireless terminal to the AP is determined according to an actual configuration requirement. For example, in a home network, when both the AP and the wireless terminal have been installed, powered on, and ready for service, the credential information and the identification information of the wireless terminal may be sent to the AP immediately after the verifying unit 803 completes verification on the wireless terminal. In a sensor network, the credential information and the identification information of the wireless terminal may be sent to the AP a long time after the verifying unit 803 completes verification on the wireless terminal, because a large quantity of sensor devices need to be configured and the sensor devices are scattered after installation, thereby turning configuration after installation into inconvenience and necessitating batch configuration before installation.

Exemplarily, the verifying unit 803 performs verification with the wireless terminal according to the first configuration password information, to determine that the wireless terminal has ownership of the second configuration password information that is the same as first configuration password information, where the verifying unit 803 may use different verification methods for the wireless terminal. The following describes processes of three verification methods in detail. 1. The verifying unit 803 and the wireless terminal perform a four-way handshake to perform mutual verification, to be specific, the configuration device 70 needs to verify that the wireless terminal has ownership of the first configuration password information acquired by the configuration device 70, and the wireless terminal also verifies that the configuration device 70 has acquired the second configuration password information of the wireless terminal. 2. The verifying unit 803 verifies the wireless terminal unidirectionally, to be specific, the configuration device 70 verifies that the first configuration password information acquired by the configuration device 70 comes from the wireless terminal involved in the configuration process performed by the configuration device 70. 3. The verifying unit 803 and the wireless terminal perform two-way verification using an EAP authentication process in the existing WPS2.0, to be specific, the configuration device 70 needs to verify that the wireless terminal has ownership of the first configuration password information acquired by the configuration device 70, and the wireless terminal also verifies that the configuration device 70 has acquired the second configuration password information of the wireless terminal. It should be noted that, there may be multiple verification manners, and any verification manner in which matching and confirmation are performed by means of information exchange is applicable to the verification process in this embodiment of the present disclosure. The three verification manners provided in this embodiment of the present disclosure are merely used as examples to describe the verification process in detail. The following separately describes the foregoing three verification manners.

Method 1:

A. The verifying unit 803 and the wireless terminal may each generate a random value, where respective random values are Ra and Ea. The verifying unit 803 sends a message 1, where the message 1 includes Ra, and receives a message 2 Ea sent by the wireless terminal, where the message 2 includes Ea and a first MIC that is obtained by the wireless terminal by encrypting a digest of the message 2 using Key1.

B. The verifying unit 803 generates a shared key Key2 according to the received Ea, the Ra generated by the verifying unit 803, and the first configuration password information, where a manner for the verifying unit 803 to generate Key2 is the same as a manner for the wireless terminal to generate Key1. The verifying unit 803 uses Key2 to generate a second MIC in a same manner as the wireless terminal generates the first MIC, and matches the second MIC against the first MIC.

If the second MIC does not match the first MIC, the configuration interaction process is ended. Exemplarily, if the second MIC does not match the first MIC, the verifying unit 803 determines that the second configuration password information of the wireless terminal is different from the first configuration password information acquired by the configuration device 70. The configuration device 70 may send result information indicating that the second MIC does not match the first MIC to the wireless terminal, and receive disconnect information sent by the wireless terminal, to end the configuration interaction process. Alternatively, the configuration device 70 directly ends the configuration interaction process.

If the second MIC matches the first MIC, the verifying unit 803 encrypts a digest of a message 3 using Key2 to generate a third MIC, and the configuration device 70 sends the message 3 to the wireless terminal. Exemplarily, if the second MIC matches the first MIC, the verifying unit 803 determines that the second configuration password information of the wireless terminal is the same as the first configuration password information acquired by the configuration device 70. The configuration device 70 generates the credential information required for the wireless terminal to access the AP, and sends the message 3 to the wireless terminal, where the message 3 includes the third MIC obtained by encrypting the digest of the message 3 using Key2, and the credential information required for the wireless terminal to access the AP and the device identification information of the AP that are encrypted using Key2, such that the wireless terminal side generates, according to Key2, a fourth MIC that is to be matched against the third MIC. It should be noted that, persons skilled in the art may understand that, when to generate the credential information before sending it is not specifically limited.

C. If the wireless terminal determines that the third MIC matches the fourth MIC, the wireless terminal sends information indicating that matching succeeds to the configuration device 70. If the wireless terminal determines that the third MIC does not match the fourth MIC, the configuration interaction process is ended. For example, the wireless terminal sends result information indicating that the third MIC does not match the fourth MIC to the configuration device 70, and the configuration device 70 sends disconnect information to the wireless terminal, to end the configuration interaction process, or directly ends the configuration interaction process.

It should be noted that, persons skilled in the art may understand that, the identification information of the AP is relatively public, and it is not necessarily required to encrypt the identification information. For example, the identification information of the AP is explicitly carried in the message 3 as plain text, or is sent using another message. This embodiment merely provides a feasible method by way of example, and not by way of limitation.

Method 2:

A. The verifying unit 803 generates a random value Ra and the credential information required for the wireless terminal to access the AP. Exemplarily, the verifying unit 803 may encrypt, using the first configuration password information, the random value Ra and the credential information required for the wireless terminal to access the AP to obtain encryption information 1.

B. The verifying unit 803 sends the encryption information 1 to the wireless terminal. It should be noted that, persons skilled in the art may understand that, when to generate the credential information before sending it is not specifically limited.

C. The verifying unit 803 receives an encryption message 2 sent by the wireless terminal, where the encryption message 2 is obtained by the wireless terminal by encrypting a random value Ra' using the second configuration password information, where the random value Ra' is decrypted from the received encryption information using the second configuration password information.

D. The verifying unit 803 decrypts the received encryption information 2 using the first configuration password information, and matches a random value Ra" obtained after the decryption against the random value Ra generated by the verifying unit 803.

If the random value Ra" does not match the random value Ra, the configuration device 70 ends the configuration interaction process. Exemplarily, if the verifying unit 803 determines that Ra" does not match Ra, the configuration device 70 sends disconnect information to the wireless terminal, to end the configuration interaction process, or directly ends the configuration interaction process.

If Ra" matches Ra, the verifying unit 803 determines that the matching succeeds, and the configuration device 70 sends the device identification information of the AP to the wireless terminal. It should be noted that, the device identification information of the AP may also be encrypted and sent together with the credential information in the foregoing verification process. Alternatively, the device identification information of the AP may also be explicitly sent in the foregoing verification process as plain text. This embodiment of the present disclosure is not limited thereto.

Method 3:

Interaction in this verification method is based on an EAP authentication process involving message 1 to message 8 in the existing WPS2.0 standard. The configuration device 70 and the wireless terminal may complete the configuration process using 8 messages (M1 to M8). Messages M1 to M8 are standard messages in the protocol, and specific content thereof is not described herein again. The process is as follows.

A. The verifying unit 803 and the wireless terminal use a dynamic key exchange algorithm to agree upon a set of temporary keys that will be used between the wireless terminal and the configuration device 70. The set of temporary keys are used to encrypt subsequent verification interaction messages and important data such as configuration data and credential information, to ensure security of the configuration process. For example, a DH dynamic key exchange algorithm is preferably used in this embodiment of the present disclosure. However, this does not mean that this embodiment of the present disclosure is merely limited to using the dynamic key exchange algorithm.

B. The verifying unit 803 divides the first configuration password information into the first half and the second half, and separately encrypts them. Preferably, an AES algorithm is selected for encryption in this embodiment of the present disclosure. However, this does not mean that this embodiment of the present disclosure is merely limited to this algorithm. Encryption information of the first half is R1, encryption information of the second half is R2, an encryption key of R1 is $R_{k1}$, and an encryption key of R2 is $R_{k2}$. Correspondingly, the wireless terminal also divides the second configuration password information into the first half and the second half, and separately encrypts them using a same encryption algorithm that is also applied to R1 and R2. Encryption information of the first half is E1, encryption information of the second half is E2, an encryption key of E1 is $E_{k1}$, and an encryption key of E2 is $E_{k2}$.

C. The verifying unit 803 receives E1 and E2 that are sent by the wireless terminal to the configuration device 70, and sends the encryption information R1 and R2 and $R_{k1}$ to the wireless terminal, such that the wireless terminal can encrypt the first half of the second configuration password information according to $R_{k1}$ using a same encryption algorithm that is also applied to R1 and R2. If a result of the encryption is equal to R1, the wireless terminal determines that the first half of the first configuration password information matches the first half of the second configuration password information, and the verifying unit 803 receives $E_{k1}$ sent by the wireless terminal. If a result of the encryption is not equal to R1, the wireless terminal determines that the first configuration password information does not match the second configuration password information. In which case, the configuration interaction process is ended. For example, the configuration device 70 receives result information that is sent by the wireless terminal and indicates that the first configuration password information does not match the second configuration password information, and sends disconnect information to the wireless terminal, to end the configuration interaction process, or directly ends the configuration interaction process.

D. If the verifying unit 803 determines that the first half of the first configuration password information matches the first half of the second configuration password information, the verifying unit 803 sends the encryption key $R_{k2}$ of the second half of the second configuration password information to the wireless terminal. Exemplarily, the verifying unit 803 encrypts the first half of the first configuration password information according to $E_{k1}$ using a same encryption algorithm that is also applied to R1 and R2. If a result of the encryption is equal to E1, it is determined that the first half of the first configuration password information matches the first half of the second configuration password information, and the encryption key $R_{k2}$ of the second half of the second configuration password information is sent to the wireless terminal, such that the wireless terminal can encrypt the second half of the second configuration password information according to $R_{k2}$ using a same encryption algorithm that is also applied to R1 and R2. If a result of the encryption is equal to R2, the wireless terminal determines that the second half of the first configuration password information matches the second half of the second configuration password information, and sends $E_{k2}$ to the configuration device 70. If a result of the encryption result is not equal to E1, the verifying unit 803 determines that the first configuration password information does not match the second configuration password information. In which case, the configuration interaction process is ended. For example, the configuration device 70 may send result information indicating that the first configuration password information does not match the second configuration password information to the wireless terminal, and the wireless terminal sends disconnect information to the wireless terminal, to end the configuration interaction process, or directly ends the configuration interaction process.

E. If the verifying unit 803 determines that the second half of the first configuration password information matches the second half of the second configuration password information, the configuration device 70 generates the credential information required for the wireless terminal to access the AP and sends the credential information to the wireless terminal.

Exemplarily, the process of verifying the second half is the same as the process of verifying E1 of the first half, and no details are described herein again.

Exemplarily, the credential information may include authentication information of the wireless terminal and a key for encrypting and decrypting a communication message between the AP and the wireless terminal.

Exemplarily, the foregoing three examples of verification methods all are applicable to when configuration password information is a PIN code, or when configuration password information is a password in an NFC label, or when configuration password information is a multi-dimensional code, which is not limited in this embodiment. In an actual implementation, the method 1 and the method 2 exhibit a simple interaction process, but configuration password information needs to convey a large amount of information to ensure security of information transmission. For example, configuration password information in numerical format needs to consist of relatively many digits and consequently is difficult to manually input. For this reason, it would be desirable to acquire configuration password information that is not manually input. For example, configuration password information in an NFC label is read using an NFC interface, or encoded configuration password information in a QR Code is identified and read using an image sensor, such that the configuration device 70 can conveniently acquire the configuration password information without sacrificing information capacity of the configuration password information. If configuration password information is a PIN code input by a user or is configured in a PBC manner, the configuration password information consists of fewer digits. In which case, to ensure security of the configuration password information, the method 3 should be preferably used, which is an EAP interaction process in the existing WPS2.0 standard. Persons skilled in the art may understand that, an EAP interaction process in the WPS2.0 standard provides strong security to a PIN code that has only a few of digits.

This embodiment of the present disclosure provides a configuration device 70 for configuring a wireless terminal. Configuration for a wireless terminal is completed by means of direct communication between the configuration device 70 and the wireless terminal, such that configuration for the wireless terminal can still be completed without involvement of an AP in the configuration process, and flexibility with the configuration process is thereby increased. The configuration device helps address the problem in the prior art in which all devices need to be in a working state in a configuration process, and when an AP is in an area in which normal communication is not available or an AP is in an offline state, configuration for a wireless terminal cannot be completed.

Figure 11:
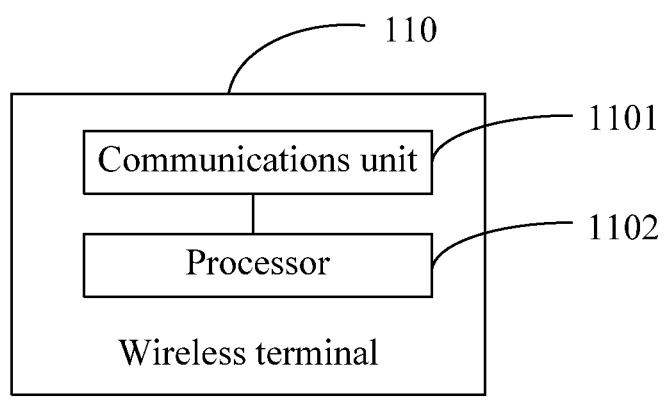
FIG. 11 is an apparatus diagram of a wireless terminal according to an embodiment of the present disclosure.

According to still another aspect, an embodiment of the present disclosure provides a wireless terminal 110. Referring to FIG. 11, the wireless terminal 110 includes a communications unit 1101 and a processor 1102.

The communications unit 1101 communicates with an external network element using a direct connect communication link.

Exemplarily, the direct connect communication link used by the communications unit 1101 to communicate with an external network element may include a P2P connection link or an ad hoc connection link, which is not limited in this embodiment of the present disclosure. Preferably, in this embodiment, a P2P connection link is used to communicate with the external network element. The wireless terminal 110 is a client in a P2P connection, and a configuration device is a GO in a P2P connection. Further, the communications unit 1101 may be further configured to send an authentication request message to the configuration device, and receive an authentication response message sent by the configuration device to the wireless terminal 110, where the authentication response message includes information indicating that a connection is allowed between the wireless terminal 110 and the configuration device. The communications unit 1101 may be further configured to send an association request message to the configuration device, and receive an association response message sent by the configuration device to the wireless terminal 110, to complete a P2P connection between the wireless terminal 110 and the configuration device.

It should be noted that, the authentication and association processes are designed in accordance with the existing IEEE 802.11-2012 protocol.

The communications unit 1101 is configured to receive configuration triggering information that is sent by the configuration device according to device identification information of the wireless terminal 110. For example, the device identification information of the wireless terminal 110 is acquired by the configuration device, and the configuration triggering information is sent by the configuration device to the wireless terminal 110 using a probe response frame or a beacon frame.

The processor 1102 is configured to perform verification with the configuration device, such that the configuration device determines that the wireless terminal 110 has ownership of configuration password information. For example, the configuration password information is acquired by the configuration device, and the wireless terminal 110 performs verification with the configuration device using an EAP message.

The communications unit 1101 is further configured to receive credential information required for the wireless terminal 110 to access an AP and identification information of the AP that are sent by the configuration device, such that after the verification succeeds, the wireless terminal 110 requests, according to the credential information and the device identification information of the AP, to access the AP.

Exemplarily, the configuration device sends the credential information required for the wireless terminal 110 to access the AP and the identification information of the AP using an EAP message. It should be noted that, persons skilled in the art may understand that, the credential information and the device identification information of the AP may be received after the verification process is ended, or may be received in a verification interaction message, or may be used as one of conditions for determining whether the verification succeeds. The present disclosure is not limited thereto. In addition, the credential information and the device identification information of the AP may be received together, and may also be received separately.

Exemplarily, for ease of description, in this embodiment, configuration password information of the wireless terminal 110 acquired by the configuration device is referred to as first configuration password information, and configuration password information possessed by the wireless terminal 110 is referred to as second configuration password information. The first configuration password information and the second configuration password information should be the same. They fall into the category of PIN or password, and may be encoded into a multi-dimensional code, stored in an NFC label, and displayed in a label or the like as a character string. For example, the multi-dimensional code of the wireless terminal 110 may be a static multi-dimensional code such as a label print multi-dimensional code, or a dynamic multi-dimensional code such as a multi-dimensional code dynamically generated by the wireless terminal 110. A multi-dimensional code style may be any identifiable, readable one-dimensional barcode or two-dimensional barcode style, for example, a UPC or a QR Code. The present disclosure is not limited thereto. The configuration password information of the wireless terminal 110 may be statically stored in an NFC label of the wireless terminal 110, or be stored in an NFC label of the wireless terminal 110 after being dynamically generated in a particular manner.

The device identification information of the wireless terminal 110 may be any information that can uniquely identify the wireless terminal 110, which is not limited in this embodiment. For example, the device identification information of the wireless terminal 110 may be a MAC address of the wireless terminal 110.

Exemplarily, the communications unit 1101 is configured to send a configuration request message to the configuration device using a beacon frame, where the configuration request message may include the device identification information of the wireless terminal 110 and indication information of using a PIN manner. The configuration device receives, according to the configuration request message, the configuration password information input by a user, where the configuration password information includes a PIN of the wireless terminal 110. Alternatively, the configuration request message includes the device identification information of the wireless terminal 110 and indication information of using a PBC manner, such that the configuration device interacts with the wireless terminal 110 in the PBC configuration manner, and uses a default PIN as the configuration password information during the interaction.

Exemplarily, the communications unit 1101 may send the configuration request message to the configuration device in any of the following manners.

A. The communications unit 1101 sends the configuration request message to the configuration device after receiving a beacon frame broadcast outward by the configuration device.

B. The communications unit 1101 proactively sends the configuration request message on each channel.

Exemplarily, the processor 1102 performs verification with the configuration device, such that the configuration device determines that the wireless terminal 110 has ownership of the configuration password information. The processor 1102 may perform verification with the configuration device using different verification methods, and the following describes processes of three verification methods in detail. It should be noted that, there may be multiple verification manners, and any verification manner in which matching and confirmation are performed by means of information exchange is applicable to the verification process in this embodiment of the present disclosure, and the three verification manners provided in this embodiment of the present disclosure are merely used as examples to describe the verification process in detail.

Method 1:

A. The processor 1102 and the configuration device may each generate a random value, where respective random values are Ea and Ra. The communications unit 1101 receives a message 1 sent by the configuration device, where the message 1 includes Ra, and the communications unit 1101 sends a message 2 to the configuration device, where the message 2 includes Ea and a first MIC that is obtained by encrypting a digest of the message 2 using Key1, such that the configuration device generates a shared key Key2 in a same manner as the wireless terminal 110 generates Key1, uses Key2 to generate a second MIC in a same manner as the wireless terminal 110 generates the first MIC, and matches the second MIC against the first MIC.

If the second MIC does not match the first MIC, the configuration interaction process is ended. The communications unit 1101 receives result information that is sent by the configuration device and indicates that the second MIC does not match the first MIC, and the communications unit 1101 sends disconnect information to the configuration device, to end the configuration interaction process. Alternatively, the processor 1102 directly ends the configuration interaction process.

If the second MIC matches the first MIC, the communications unit 1101 receives a message 3 sent by the configuration device, where the message 3 includes a third MIC obtained by encrypting a digest of the message 3 using Key2, and the credential information required for the wireless terminal 110 to access the AP and the device identification information of the AP that are encrypted using Key2. It should be noted that, persons skilled in the art may understand that, when to generate the credential information before sending it is not specifically limited.

B. The processor 1102 generates a fourth MIC according to the message 3, and matches the fourth MIC against the third MIC. If the fourth MIC matches the third MIC, the communications unit 1101 sends information indicating that the matching succeeds to the configuration device. If the fourth MIC does not match the third MIC, the configuration interaction process is ended. For example, the communications unit 1101 sends result information indicating that the fourth MIC does not match the third MIC to the configuration device, and the configuration device sends disconnect information to the wireless terminal 110, to end the configuration interaction process. Alternatively, the processor 1102 directly ends the configuration interaction process.

It should be noted that, persons skilled in the art may understand that, the identification information of the AP is relatively public, and it is not necessarily required to encrypt the identification information. For example, the identification information of the AP is explicitly carried in the message 3 as plain text, or is sent using another message. This embodiment merely provides a feasible method by way of example, and not by way of limitation.

Method 2:

A. The communications unit 1101 receives encryption information 1 sent by the configuration device, where the encryption information 1 is obtained by the configuration device by encrypting, using the first configuration password information, a random value Ra and the credential information required for the wireless terminal 110 to access the AP. It should be noted that, persons skilled in the art may understand that, when to generate the credential information before sending it is not specifically limited.

B. The communications unit 1101 sends an encryption message 2 to the configuration device.

Exemplarily, the processor 1102 decrypts the received encryption information 1 using the second configuration password information, to obtain a random value Ra' after decryption, and then encrypts Ra' using the second configuration password information to obtain the encryption message 2.

C. The configuration device decrypts the encryption information 2 according to the first configuration password information, to obtain a random value Ra" after decryption, and matches Ra" against Ra. If Ra" does not match Ra, the configuration interaction process is ended. For example, the configuration device may send result information indicating that Ra" does not match Ra to the wireless terminal 110, and the wireless terminal 110 sends disconnect information to the configuration device, to end the configuration interaction process. Alternatively, the configuration device directly ends the configuration interaction process. If Ra" matches Ra, the configuration device sends the device identification information of the AP to the wireless terminal 110.

It should be noted that, the device identification information of the AP may also be encrypted and sent together with the credential information in the foregoing verification process. Alternatively, the device identification information of the AP may also be explicitly sent in the foregoing verification process as plain text. This embodiment of the present disclosure is not limited thereto.

Method 3:

Interaction in this verification method is based on an EAP authentication process involving message 1 to message 8 in the existing WPS2.0 standard. The configuration device and the wireless terminal 110 may complete the configuration process using 8 messages (M1 to M8). Messages M1 to M8 are standard messages in the protocol, and specific content thereof is not described herein again. The process is as follows.

A. The processor 1102 and the configuration device use a dynamic key exchange algorithm to agree upon a set of temporary keys that will be used between the wireless terminal 110 and the configuration device. The set of temporary keys are used to encrypt subsequent verification interaction messages and important data such as configuration data and credential information, to ensure security of the configuration process. For example, a DH dynamic key exchange algorithm is preferably used in this embodiment of the present disclosure. However, this does not mean that this embodiment of the present disclosure is merely limited to using the dynamic key exchange algorithm.

B. The processor 1102 divides the second configuration password information into the first half and the second half, and separately encrypts them. Preferably, an AES algorithm is selected for encryption in this embodiment of the present disclosure. However, this does not mean that this embodiment of the present disclosure is merely limited to this algorithm. Encryption information of the first half is E1, encryption information of the second half is E2, an encryption key of E1 is $E_{k1}$, and an encryption key of E2 is $E_{k2}$. The communications unit 1101 is instructed to send E1 and E2 to the configuration device. Correspondingly, the configuration device also divides the first configuration password information into the first half and the second half, and separately encrypts them using a same encryption algorithm that is also applied to E1 and E2. Encryption information of the first half is R1, encryption information of the second half is R2, an encryption key of R1 is $R_{k1}$, and an encryption key of R2 is $R_{k2}$.

C. The communications unit 1101 receives R1, R2, and $R_{k1}$ that are sent by the configuration device, and encrypts the first half of the second configuration password information according to $R_{k1}$ using a same encryption algorithm that is also applied to E1 and E2. If a result of the encryption is equal to R1, the wireless terminal 110 determines that the first half of the first configuration password information matches the first half of the second configuration password information, and the communications unit 1101 sends $E_{k1}$ to the configuration device.

If a result of the encryption is not equal to R1, the processor 1102 determines that the first configuration password information does not match the second configuration password information. In which case, the configuration interaction process is ended. For example, the communications unit 1101 sends result information indicating that the first configuration password information does not match the second configuration password information to the configuration device, and receives disconnect information sent by the configuration device, to end the configuration interaction process. Alternatively, the processor 1102 directly ends the configuration interaction process.

D. The configuration device determines whether the first half of the first configuration password information matches the first half of the second configuration password information.

If the first half of the first configuration password information matches the first half of the second configuration password information, the configuration device sends $R_{k2}$ to the wireless terminal 110.

If the first half of the first configuration password information does not match the first half of the second configuration password information, the configuration interaction process is ended. For example, the configuration device sends result information indicating that the first half of the first configuration password information does not match the first half of the second configuration password information to the wireless terminal 110, and the wireless terminal 110 sends disconnect information to the configuration device, to end the configuration interaction process, or directly ends the configuration interaction process.

E. The communications unit 1101 receives $R_{k2}$ sent by the configuration device, and the processor 1102 determines, according to $R_{k2}$, whether the second half of the first configuration password information matches the second half of the second configuration password information.

If the second half of the first configuration password information matches the second half of the second configuration password information, the communications unit 1101 sends $E_{k2}$ to the configuration device.

If the second half of the first configuration password information does not match the second half of the second configuration password information, the configuration interaction process is ended. For example, the communications unit 1101 sends result information indicating that the second half of the first configuration password information does not match the second half of the second configuration password information to the configuration device, and receives disconnect information sent by the configuration device, to end the configuration interaction process, or directly ends the configuration interaction process.

F. The configuration device determines whether the second half of the first configuration password information matches the second half of the second configuration password information.

If the second half of the first configuration password information matches the second half of the second configuration password information, the configuration device sends the credential information required for the wireless terminal 110 to access the AP to the wireless terminal 110. Exemplarily, the credential information may include authentication information of the wireless terminal 110 and a key for encrypting and decrypting a communication message between the AP and the wireless terminal 110.

If the second half of the first configuration password information does not match the second half of the second configuration password information, the configuration interaction process is ended. For example, the configuration device sends result information indicating that the second half of the first configuration password information does not match the second half of the second configuration password information to the wireless terminal 110, and the wireless terminal 110 sends disconnect information to the configuration device, to end the configuration interaction process, or directly ends the configuration interaction process.

Exemplarily, the foregoing three examples of verification methods all are applicable to when configuration password information is a PIN code, or when configuration password information is a password in an NFC label, or when configuration password information is a multi-dimensional code, which is not limited in this embodiment. In an actual implementation, the method 1 and the method 2 exhibit a simple interaction process, but configuration password information needs to convey a large amount of information to ensure security of information transmission. For example, configuration password information in numerical format needs to consist of relatively many digits and consequently is difficult to manually input. For this reason, it would be desirable to acquire configuration password information that is not manually input. For example, configuration password information in an NFC label is read using an NFC interface, or encoded configuration password information in a QR Code is identified and read using an image sensor, such that the configuration device can conveniently acquire the configuration password information without sacrificing information capacity of the configuration password information. If configuration password information is a PIN code input by a user or is configured in a PBC manner, the configuration password information consists of fewer digits. In which case, to ensure security of the configuration password information, the method 3 should be preferably used, which is an EAP interaction process in the existing WPS2.0 standard. Persons skilled in the art may understand that, an EAP interaction process in the WPS2.0 standard provides strong security to a PIN code that has only a few of digits.

This embodiment of the present disclosure provides the wireless terminal 110 for configuring a wireless terminal. Configuration for the wireless terminal 110 is completed by means of direct communication between the wireless terminal 110 and a configuration device, such that configuration for the wireless terminal 110 can still be completed without involvement of an AP in the configuration process, and flexibility with the configuration process is thereby increased. The wireless terminal helps address the problem in the prior art in which all devices need to be in a working state in a configuration process, and when an AP is in an area in which normal communication is not available or an AP is in an offline state, configuration for the wireless terminal 110 cannot be completed.

According to still another aspect, an embodiment of the present disclosure provides a wireless terminal 110. The wireless terminal 110 may use a direct connection manner to perform direct communication with a configuration device, to complete verification with the configuration device, where the direct connection manner may include a P2P connection manner or an ad hoc connection manner, and the direct connection manner between the wireless terminal and the configuration device is not limited in this embodiment of the present disclosure. Preferably, in this embodiment, the configuration device and the wireless terminal use a P2P connection manner. The wireless terminal 110 is a client in a P2P connection, and the configuration device is a GO in a P2P connection. The process of implementing a P2P connection has been described in detail in the method embodiments, and no details are described herein again.

Figure 12:
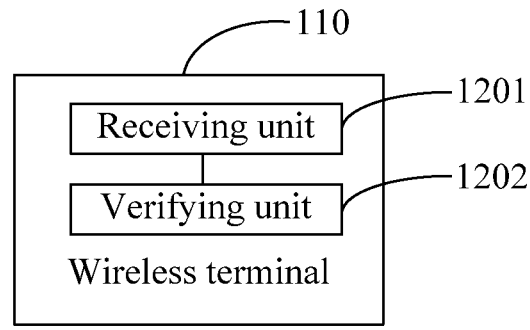
FIG. 12 is an apparatus diagram of another wireless terminal according to an embodiment of the present disclosure.

Referring to FIG. 12, the wireless terminal 110 includes a receiving unit 1201 and a verifying unit 1202.

The receiving unit 1201 is configured to receive, using a direct connect communication link, configuration triggering information that is sent by the configuration device according to device identification information of the wireless terminal 110. For example, the device identification information of the wireless terminal 110 is acquired by the configuration device, and the configuration device may send the configuration triggering information to the wireless terminal 110 using a beacon frame or a probe response frame.

The verifying unit 1202 is configured to perform verification with the configuration device using the direct connect communication link, such that the configuration device determines that the wireless terminal 110 has ownership of configuration password information. For example, the configuration password information is acquired by the configuration device, and the verifying unit 1202 may perform verification with the configuration device using an EAP message.

Exemplarily, for ease of description, in this embodiment, configuration password information of the wireless terminal 110 acquired by the configuration device is referred to as first configuration password information, and configuration password information possessed by the wireless terminal 110 is referred to as second configuration password information. The first configuration password information and the second configuration password information should be the same. They fall into the category of PIN or password, and may be encoded into a multi-dimensional code, stored in an NFC label, and displayed in a label or the like as a character string. For example, the multi-dimensional code of the wireless terminal 110 may be a static multi-dimensional code such as a label print multi-dimensional code, or a dynamic multi-dimensional code such as a multi-dimensional code dynamically generated by the wireless terminal 110. A multi-dimensional code style may be any identifiable, readable one-dimensional barcode or two-dimensional barcode style, for example, a UPC or a QR Code. The present disclosure is not limited thereto. The configuration password information of the wireless terminal 110 may be statically stored in an NFC label of the wireless terminal 110, or be stored in an NFC label of the wireless terminal 110 after being dynamically generated in a particular manner.

The device identification information of the wireless terminal 110 may be any information that can uniquely identify the wireless terminal 110, which is not limited in this embodiment, for example, may be a MAC address of the wireless terminal 110.

The receiving unit 1201 is further configured to receive, using the direct connect communication link, credential information required for the wireless terminal 110 to access an AP and identification information of the AP that are sent by the configuration device, such that after the verification succeeds, the wireless terminal 110 requests, according to the credential information and device identification information of the AP, to access the AP.

Exemplarily, the receiving unit 1201 may receive the credential information required for the wireless terminal 110 to access the AP and the identification information of the AP that are sent by the configuration device using an EAP message. Persons skilled in the art may understand that, the credential information and the device identification information of the AP may be received after the verification process is ended, or may be received in a verification interaction message, or may be used as one of conditions for determining whether the verification succeeds. The present disclosure is not limited thereto. In addition, the credential information and the device identification information of the AP may be received together, and may also be received separately.

Figure 13:
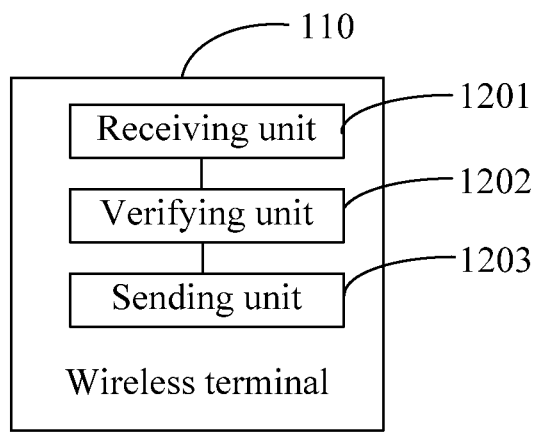
FIG. 13 is an apparatus diagram of another wireless terminal according to an embodiment of the present disclosure.

Exemplarily, referring to FIG. 13, the wireless terminal 110 further includes a sending unit 1203 configured to send a configuration request message to the configuration device. For example, the configuration request message includes the device identification information of the wireless terminal 110 and indication information of using a PIN manner, such that the configuration device receives, according to the configuration request message, the configuration password information input by a user, where the configuration password information includes a PIN of the wireless terminal 110. Alternatively, the configuration request message includes the device identification information of the wireless terminal 110 and indication information of using a PBC manner, such that the configuration device interacts with the wireless terminal 110 in the PBC configuration manner, and uses a default PIN as the configuration password information during the interaction.

Exemplarily, the sending unit 1203 may send the configuration request message to the configuration device in any of the following manners.

A. The sending unit 1203 sends the configuration request message to the configuration device after receiving a beacon frame broadcast outward by the configuration device.

B. The sending unit 1203 proactively sends the configuration request message on each channel. Exemplarily, the verifying unit 1202 performs verification with the configuration device, where the verifying unit 1202 may perform verification with the configuration device using different verification methods, and the following describes processes of three verification methods in detail. It should be noted that, there may be multiple verification manners, any verification manner in which matching and confirmation are performed by means of information exchange is applicable to the verification process in this embodiment of the present disclosure, and the three verification manners provided in this embodiment of the present disclosure are merely used as examples to describe the verification process in detail.

Method 1:

A. The verifying unit 1202 and the configuration device may each generate a random value, where respective random values are Ea and Ra. The verifying unit 1202 receives a message 1 sent by the configuration device, where the message 1 includes Ra, and instructs the communications unit 1101 to send a message 2 to the configuration device, where the message 2 includes Ea and a first MIC that is obtained by encrypting a digest of the message 2 using Key1, such that the configuration device generates a shared key Key2 in a same manner as the wireless terminal 110 generates Key1, uses Key2 to generate a second MIC in a same manner as the wireless terminal 110 generates the first MIC, and matches the second MIC against the first MIC.

If the second MIC does not match the first MIC, the verifying unit 1202 receives result information that is sent by the configuration device and indicates that the second MIC does not match the first MIC, and sends disconnect information to the configuration device, to end the configuration interaction process, or directly ends the configuration interaction process.

If the second MIC matches the first MIC, the verifying unit 1202 receives a message 3 sent by the configuration device, where the message 3 includes a third MIC obtained by encrypting a digest of the message 3 using Key2, and the credential information required for the wireless terminal 110 to access the AP and the device identification information of the AP that are encrypted using Key2. It should be noted that, persons skilled in the art may understand that, when to generate the credential information before sending it is not specifically limited.

B. The verifying unit 1202 generates a fourth MIC according to the message 3, and matches the fourth MIC against the third MIC.

If the fourth MIC matches the third MIC, the verifying unit 1202 sends information indicating that the matching succeeds to the configuration device.

If the fourth MIC does not match the third MIC, the wireless terminal 110 sends result information indicating that the fourth MIC does not match the third MIC to the configuration device, and receives disconnect information sent by the configuration device, to end the configuration interaction process, or directly ends the configuration interaction process.

It should be noted that, persons skilled in the art may understand that, the identification information of the AP is relatively public, and it is not necessarily required to encrypt the identification information. For example, the identification information of the AP is explicitly carried in the message 3 as plain text, or is sent using another message. This embodiment merely provides a feasible method by way of example, and not by way of limitation.

Method 2:

A. The verifying unit 1202 receives encryption information 1 sent by the configuration device. For example, the encryption information 1 is obtained by the configuration device by encrypting, using the first configuration password information, a random value Ra and the credential information required for the wireless terminal 110 to access the AP. It should be noted that, persons skilled in the art may understand that, when to generate the credential information before sending it is not specifically limited.

B. The verifying unit 1202 sends an encryption message 2 to the configuration device. For example, the verifying unit 1202 decrypts the received encryption information 1 using a second configuration password, to obtain a random value Ra' after decryption, and then encrypts the random value Ra' after decryption using the second configuration password information to obtain the encryption message 2.

C. The configuration device decrypts the encryption information 2 according to the first configuration password information, to obtain a random value Ra" after decryption, and matches Ra" against Ra. If Ra" does not match Ra, the configuration interaction process is ended. For example, the configuration device may send result information indicating that Ra" does not match Ra to the wireless terminal 110, and the wireless terminal 110 sends disconnect information to the configuration device, to end the configuration interaction process. Alternatively, the configuration device directly ends the configuration interaction process. If Ra" matches Ra, the configuration device sends the device identification information of the AP to the wireless terminal 110.

Method 3:

Interaction in this verification method is based on an EAP authentication process involving message 1 to message 8 in the existing WPS2.0 standard. The configuration device and the wireless terminal may complete the configuration process using 8 messages (M1 to M8). Messages M1 to M8 are standard messages in the protocol, and specific content thereof is not described herein again. The process is as follows.

A. The verifying unit 1202 and the configuration device use a dynamic key exchange algorithm to agree upon a set of temporary keys that will be used between the wireless terminal 110 and the configuration device. The set of temporary keys are used to encrypt subsequent verification interaction messages and important data such as configuration data and credential information, to ensure security of the configuration process. For example, a DH dynamic key exchange algorithm is preferably used in this embodiment of the present disclosure. However, this does not mean that this embodiment of the present disclosure is merely limited to using the dynamic key exchange algorithm.

B. The verifying unit 1202 divides the second configuration password information into the first half and the second half, and separately encrypts them. Preferably, an AES algorithm is selected for encryption in this embodiment of the present disclosure. However, this does not mean that this embodiment of the present disclosure is merely limited to this algorithm. Encryption information of the first half is E1, encryption information of the second half is E2, an encryption key of E1 is $E_{k1}$, and an encryption key of E2 is $E_{k2}$. E1 and E2 are sent to the configuration device. Correspondingly, the configuration device also divides the first configuration password information into the first half and the second half, and separately encrypts them using a same encryption algorithm that is also applied to E1 and E2. Encryption information of the first half is R1, encryption information of the second half is R2, an encryption key of R1 is $R_{k1}$, and an encryption key of R2 is $R_{k2}$.

C. The verifying unit 1202 receives R1, R2, and $R_{k1}$ that are sent by the configuration device, and encrypts the first half of the second configuration password information according to $R_{k1}$ using a same encryption algorithm that is also applied to E1 and E2. If a result of the encryption is equal to R1, the wireless terminal 110 determines that the first half of the first configuration password information matches the first half of the second configuration password information, and the verifying unit 1202 sends $E_{k1}$ to the configuration device.

If a result of the encryption is not equal to R1, the verifying unit 1202 determines that the first configuration password information does not match the second configuration password information. In which case, the configuration interaction process is ended. For example, the wireless terminal 110 sends result information indicating that the first configuration password information does not match the second configuration password information to the configuration device, and receives disconnect information sent by the configuration device, to end the configuration interaction process, or directly ends the configuration interaction process.

D. The configuration device determines whether the first half of the first configuration password information matches the first half of the second configuration password information.

If the first half of the first configuration password information matches the first half of the second configuration password information, the configuration device sends $R_{k2}$ to the wireless terminal 110.

If the second half of the first configuration password information does not match the second half of the second configuration password information, the configuration interaction process is ended. For example, the configuration device sends result information indicating that the second half of the first configuration password information does not match the second half of the second configuration password information to the wireless terminal 110, and the wireless terminal 110 sends disconnect information to the configuration device, to end the configuration interaction process, or directly ends the configuration interaction process.

E. The wireless terminal 110 receives $R_{k2}$ sent by the configuration device, and the verifying unit 1202 determines, according to $R_{k2}$, whether the second half of the first configuration password information matches the second half of the second configuration password information.

If the second half of the first configuration password information matches the second half of the second configuration password information, the verifying unit 1202 sends $E_{k2}$ to the configuration device.

If the second half of the first configuration password information does not match the second half of the second configuration password information, the configuration interaction process is ended. For example, the wireless terminal 110 sends result information indicating that the second half of the first configuration password information does not match the second half of the second configuration password information to the configuration device, and receives disconnect information sent by the configuration device, to end the configuration interaction process, or directly ends the configuration interaction process.

F. The configuration device determines whether the second half of the first configuration password information matches the second half of the second configuration password information.

If the second half of the first configuration password information matches the second half of the second configuration password information, the configuration device sends the credential information required for the wireless terminal 110 to access the AP to the wireless terminal 110. Exemplarily, the credential information may include authentication information of the wireless terminal 110 and a key for encrypting and decrypting a communication message between the AP and the wireless terminal 110.

If the second half of the first configuration password information does not match the second half of the second configuration password information, the configuration interaction process is ended. For example, the configuration device sends result information indicating that the second half of the first configuration password information does not match the second half of the second configuration password information to the wireless terminal 110, and the wireless terminal 110 sends disconnect information to the configuration device, to end the configuration interaction process, or directly ends the configuration interaction process.

Exemplarily, the foregoing three examples of verification methods all are applicable to when configuration password information is a PIN code, or when configuration password information is a password in an NFC label, or when configuration password information is a multi-dimensional code, which is not limited in this embodiment. In an actual implementation, the method 1 and the method 2 exhibit a simple interaction process, but configuration password information needs to convey a large amount of information to ensure security of information transmission. For example, configuration password information in numerical format needs to consist of relatively many digits and consequently is difficult to manually input. For this reason, it would be desirable to acquire configuration password information that is not manually input. For example, configuration password information in an NFC label is read using an NFC interface, or encoded configuration password information in a QR Code is identified and read using an image sensor, such that the configuration device can conveniently acquire the configuration password information without sacrificing information capacity of the configuration password information. If configuration password information is a PIN code input by a user or is configured in a PBC manner, the configuration password information consists of fewer digits. In which case, to ensure security of the configuration password information, the method 3 should be preferably used, which is an EAP interaction process in the existing WPS2.0 standard. Persons skilled in the art may understand that, an EAP interaction process in the WPS2.0 standard provides strong security to a PIN code that has only a few of digits.

This embodiment of the present disclosure provides the wireless terminal 110 for configuring a wireless terminal. Configuration for the wireless terminal 110 is completed by means of direct communication between the wireless terminal 110 and a configuration device, such that configuration for the wireless terminal 110 can still be completed without involvement of an AP in the configuration process, and flexibility with the configuration process is thereby increased. The wireless terminal helps address the problem in the prior art in which all devices need to be in a working state in a configuration process, and when an AP is in an area in which normal communication is not available or an AP is in an offline state, configuration for the wireless terminal 110 cannot be completed.

Figure 14:
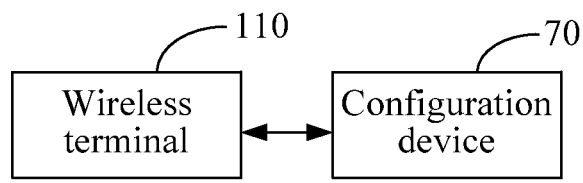
FIG. 14 is a diagram of a wireless terminal configuration system according to an embodiment of the present disclosure.

According to still another aspect, an embodiment of the present disclosure provides a wireless terminal configuration system. Referring to FIG. 14, the system may include a configuration device 70 according to any one of the foregoing embodiments and a wireless terminal 110 according to any one of the foregoing embodiments.

Figure 15:
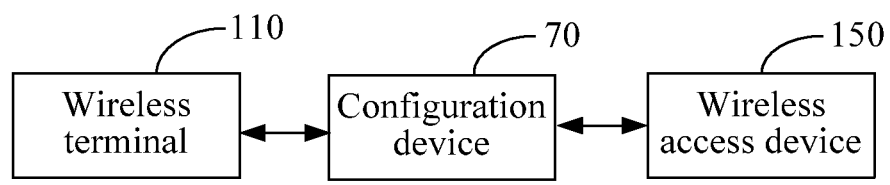
FIG. 15 is a diagram of another wireless terminal configuration system according to an embodiment of the present disclosure.

Exemplarily, referring to FIG. 15, the system may further include a wireless access device 150 configured to receive credential information of a wireless terminal 110 and identification information of the wireless terminal 110 that are sent by a configuration device 70, and process, according to the credential information of the wireless terminal 110 and the identification information of the wireless terminal 110, a request of the wireless terminal 110 to access the wireless access device.

In the wireless terminal configuration system provided in this embodiment of the present disclosure, configuration for the wireless terminal 110 is completed by means of direct communication between the configuration device 70 and the wireless terminal 110, such that configuration for the wireless terminal 110 can still be completed without involvement of the wireless access device 150 in the configuration process, and flexibility with the configuration process is thereby increased. The wireless terminal configuration system helps address the problem in the prior art in which all devices need to be in a working state in a configuration process, and when the wireless access device 150 is in an area in which normal communication is not available or the wireless access device 150 is in an offline state, configuration for the wireless terminal 70 cannot be completed.

In the several embodiments provided in the present disclosure, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A wireless terminal configuration method, wherein a direct wireless connection is established between a configuration device and a wireless terminal, and wherein the method comprises:
   acquiring, by the configuration device, device identification information and configuration password information of the wireless terminal;
   sending, by the configuration device, configuration triggering information to the wireless terminal according to the device identification information of the wireless terminal;
   performing, by the configuration device, verification with the wireless terminal according to the configuration password information, to determine that the wireless terminal has ownership of the configuration password information;
   sending, by the configuration device, credential information required for the wireless terminal to access a wireless access device and device identification information of the wireless access device to the wireless terminal; and
   sending, by the configuration device, the credential information and the device identification information of the wireless terminal to the wireless access device,
   wherein performing the verification comprises:
   generating, by the configuration device, a first random value;
   sending, by the configuration device, a first message to the wireless terminal, wherein the first message includes the first random value;
   receiving, by the configuration device from the wireless terminal, a second message that includes a second random value and a first message integrity code (MIC) that corresponds to a digest of the second message encrypted according to a first shared key;
   generating, by the configuration device, a second shared key according to the second random value, the first random value, and the configuration password information;
   generating, by the configuration device, a second MIC using the second shared key;
   determining, by the configuration device, whether the first MIC matches the second MIC;
   encrypting, by the configuration device, a digest of a third message using the second shared key to generate a third MIC when the first MIC matches the second MIC; and
   sending, by the configuration device, the third message to the wireless terminal.

2. The wireless terminal configuration method according to claim 1, wherein the configuration triggering information triggers the wireless terminal to perform subsequent configuration message exchange with the configuration device, and wherein acquiring, by the configuration device, the device identification information and the configuration password information of the wireless terminal comprises scanning a multi-dimensional code of the wireless terminal.

3. The wireless terminal configuration method according to claim 1, wherein acquiring, by the configuration device, the device identification information and the configuration password information of the wireless terminal comprises:
  receiving, by the configuration device, a configuration request message sent by the wireless terminal, wherein the configuration request message comprises the device identification information of the wireless terminal and indication information of using a personal identification number (PIN) manner; and
  receiving, by the configuration device, the configuration password information input by a user, wherein the configuration password information comprises a PIN of the wireless terminal.

4. The wireless terminal configuration method according to claim 1, wherein acquiring, by the configuration device, the device identification information and the configuration password information of the wireless terminal comprises:
  receiving, by the configuration device, a configuration request message sent by the wireless terminal, and wherein the configuration request message comprises the device identification information of the wireless terminal and indication information of using a push button configuration (PBC) manner;
  interacting, by the configuration device, with the wireless terminal in the PBC configuration manner; and
  using a default PIN as the configuration password information during the interaction.

5. A wireless terminal configuration method, wherein a direct wireless connection is established between a wireless terminal and a configuration device, and wherein the method comprises:
  receiving, by the wireless terminal from the configuration device via a probe response frame or a beacon frame, configuration triggering information;
  performing, by the wireless terminal, verification with the configuration device to establish that the wireless terminal has ownership of configuration password information;
  receiving, by the wireless terminal from the configuration device, credential information for the wireless terminal to access a wireless access device and identification information of the wireless access device; and
  after the verification succeeds, requesting, by the wireless terminal according to the credential information and the device identification information of the wireless access device, access to the wireless access device,
  wherein performing the verification comprises:
    receiving, by the wireless terminal from the configuration device, a first message comprising a first random value;
    sending, by the wireless terminal to the configuration device, a second message that includes a second random value and a first message integrity code (MIC) that corresponds to a digest of the second message encrypted according to ta first shared key; and
    receiving, from the configuration device by the wireless terminal, a third message comprising a third MIC generated using a second shared key when the first MIC matches a second MIC generated using a second shared key generated according to the second random value, the first random value, and the configuration password information.

6. The wireless terminal configuration method according to claim 5, wherein before receiving, by the wireless terminal, the configuration triggering information from the configuration device, the method further comprises sending, by the wireless terminal, a configuration request message to the configuration device, wherein the configuration request message comprises the device identification information of the wireless terminal and indication information of using a personal identification number (PIN) manner, and wherein the configuration password information comprises a PIN of the wireless terminal.

7. The wireless terminal configuration method according to claim 5, wherein before receiving the configuration triggering information from the configuration device, the method further comprises:
  sending, by the wireless terminal, a configuration request message to the configuration device, wherein the configuration request message comprises the device identification information of the wireless terminal and indication information of using a push button configuration (PBC) manner,
  interacting with the configuration device in the PBC configuration manner; and
  using a default personal identification number as the configuration password information during the interaction with the configuration device.

8. A configuration device, comprising:
  an acquirer configured to acquire configuration password information;
  a processor coupled to the acquirer and configured to:
    generate configuration triggering information according to the configuration password information; and
    perform verification with a wireless terminal according to the configuration password information to determine that the wireless terminal has ownership of the configuration password information; and
  a transmitter coupled to the processor and configured to:
    send the configuration triggering information to the wireless terminal via a direct connect communication link between the configuration device and the wireless terminal;
    send, via the direct connect communication link, credential information for the wireless terminal to access a wireless access device and device identification information of the wireless access device to the wireless terminal; and
    send the credential information of the wireless terminal and device identification information of the wireless terminal to the wireless access device,
  wherein the processor configured to perform verification comprises the processor configured to:
    generate a first random value:
    send a first message to the wireless terminal, wherein the first message includes the first random value;
    receive a second message that includes a second random value and a first message integrity code (MIC) that corresponds to a digest of the second message encrypted according to a first shared key;
    generate a second shared key according to the second random value, the first random value, and the configuration password information;
    generate a second MIC using the second shared Key;
    determine whether the first MIC matches the second MIC;
    encrypt a digest of a third message using the second shared key to generate a third MIC when the first MIC matches the second MIC; and
    send the third message to the wireless terminal.

9. The configuration device according to claim 8, wherein the acquirer comprises a multi-dimensional code scanner configured to scan a multi-dimensional code of the wireless terminal to acquire the configuration password information and the device identification information of the wireless terminal.

10. The configuration device according to claim 8, further comprising a receiver coupled to the processor and configured to receive a configuration request message from the wireless terminal, wherein the configuration request message comprises the device identification information of the wireless terminal and indication information of using a personal identification number (PIN) manner, wherein the acquirer comprises a keyboard configured to receive the configuration password information of the wireless terminal input by a user, and wherein the configuration password information comprises a PIN of the wireless terminal.

11. The configuration device according to claim 8, further comprising a receiver coupled to the processor and configured to receive a configuration request message sent by the wireless terminal, wherein the configuration request message comprises the device identification information of the wireless terminal and indication information of using a push button configuration (PBC) manner, and wherein the acquirer comprises a PBC button configured to:
  interact with the wireless terminal in the PBC configuration manner; and
  use a default personal identification number as the configuration password information during the interaction.

12. The configuration device according to claim 8, wherein the acquirer comprises a near field communication (NFC) interface configured to read the configuration password information of the wireless terminal and the device identification information of the wireless terminal.

13. A wireless terminal, comprising:
  a receiver configured to receive, from a configuration device via a probe response frame or a beacon frame, configuration triggering information; and
  a processor coupled to the receiver and configured to:
    perform verification with the configuration device to establish that the wireless terminal has ownership of configuration password information;
    receive, from the configuration device, credential information for the wireless terminal to access a wireless access device and identification information of the wireless access device; and
    subsequent to the verification succeeding, request, according to the credential information and the device identification information of the wireless access device, access to the wireless access device,
  wherein the processor configured to perform the verification comprises the processor configured to:
    receive a first message comprising a first random value;
    send a second message that includes a second random value and a first message integrity code (MIC) that corresponds to a digest of the second message encrypted according to a first shared key; and
    receive a third message comprising a third MIC generated using a second shared key when the first MIC matches a second MIC generated using a second shared key generated according to the second random value, the first random value, and the configuration password information.

14. The wireless terminal according to claim 13, further comprising a transmitter coupled to the processor, wherein the transmitter is configured to send a configuration request message to the configuration device, wherein the configuration request message comprises the device identification information of the wireless terminal and indication information of using a personal identification number (PIN) manner, and wherein the configuration password information comprises a PIN of the wireless terminal.

15. The wireless terminal according to claim 13, further comprising a transmitter coupled to the processor, wherein the transmitter is configured to send a configuration request message to the configuration device, wherein the configuration request message comprises the device identification information of the wireless terminal and indication information of using a push button configuration (PBC) manner, and wherein the processor is configured to:
  interact with the configuration device in the PBC configuration manner; and
  use a default PIN as the configuration password information during the interaction with the configuration device.

16. The wireless terminal according to claim 13, further comprising a transmitter coupled to the processor, wherein the receiver, the transmitter, and the processor are configured to communicate with the configuration device via a direct connect communication link that includes an ad hoc connection link.

17. The wireless terminal according to claim 13, further comprising a transmitter, wherein the receiver, the transmitter, and the processor are configured to communicate with the configuration device via a direct connect communication link that includes a peer to peer (P2P) connection link.

18. The wireless terminal according to claim 17, wherein the receiver is configured to receive the configuration triggering information from the configuration device using the beacon frame.

19. The wireless terminal according to claim 17, wherein performing verification with the configuration device comprises performing verification with the configuration device using an Extensible Authentication Protocol (EAP) message.

* * * * *

UNITED STATES PATENT AND TRADEMARK OFFICE
CERTIFICATE OF CORRECTION

PATENT NO. : 10,091,650 B2
APPLICATION NO. : 14/924132
DATED : October 2, 2018
INVENTOR(S) : Xiaoxian Li et al.

It is certified that error appears in the above-identified patent and that said Letters Patent is hereby corrected as shown below:

In the Claims

Column 53, Line 55: "ta" should read "a"

Signed and Sealed this
Thirteenth Day of November, 2018

Andrei Iancu
*Director of the United States Patent and Trademark Office*